United States Patent
Rezvani

(10) Patent No.: US 10,375,534 B2
(45) Date of Patent: Aug. 6, 2019

(54) VIDEO TRANSMISSION AND SHARING OVER ULTRA-LOW BITRATE WIRELESS COMMUNICATION CHANNEL

(75) Inventor: Behrooz Rezvani, San Ramon, CA (US)

(73) Assignee: Seyyer, Inc., San Ramon, CA (US)

( * ) Notice: Subject to any disclaimer, the term of this patent is extended or adjusted under 35 U.S.C. 154(b) by 1305 days.

(21) Appl. No.: 13/334,726

(22) Filed: Dec. 22, 2011

(65) Prior Publication Data

US 2012/0327243 A1   Dec. 27, 2012

Related U.S. Application Data

(60) Provisional application No. 61/426,441, filed on Dec. 22, 2010, provisional application No. 61/483,571, (Continued)

(51) Int. Cl.
*H04W 4/14* (2009.01)
*G10L 15/14* (2006.01)
(Continued)

(52) U.S. Cl.
CPC ............ *H04W 4/14* (2013.01); *H04N 7/12* (2013.01); *G06K 9/62* (2013.01); *G10L 13/00* (2013.01);
(Continued)

(58) Field of Classification Search
CPC .. H04W 4/12; H04B 1/38; H04N 5/38; H04N 5/44; H04N 7/12; H04N 7/18;
(Continued)

(56) References Cited

U.S. PATENT DOCUMENTS 5,946,419 A * 8/1999 Chen ................... G06T 17/00
                                                                375/E7.03
6,250,928 B1   6/2001 Poggio et al.
(Continued)

FOREIGN PATENT DOCUMENTS

CN          1117344 C     8/2003
JP       2003216173 A     7/2003
(Continued)

OTHER PUBLICATIONS

Pearson, K. 1901, "On Lines and Planes of Closest Fit to Systems of Points in Space", http://stat.smmu.edu.cn/history/pearson1901.pdf, *Philosophical Magazine*, 2 (6):559-572.
(Continued)

*Primary Examiner* — Thai Q Tran
*Assistant Examiner* — Syed Y Hasan

(57) ABSTRACT

Techniques for transmitting and sharing a video sequence over an ultra-low bandwidth channel, such as a short message service (SMS) channel, are disclosed herein. A video is segmented into regions of various interest levels. A set of parameters is developed from a video region of a high interest, wherein the parameters represent a mapping function of a database to model the video region. The set of parameters is transmitted over the ultra-low bandwidth channel to a remote device, wherein the remote device also has access to an instance of the database. The remote device synthesizes the video by using the mapping function of the database, which is represented by the transmitted set of parameters.

32 Claims, 11 Drawing Sheets

Related U.S. Application Data filed on May 6, 2011, provisional application No. 61/544,123, filed on Oct. 6, 2011.

(51) Int. Cl.

| | | |
|---|---|---|
| *G10L 19/00* | (2013.01) | |
| *G10L 13/00* | (2006.01) | |
| *G10L 15/24* | (2013.01) | |
| *G10L 25/63* | (2013.01) | |
| *H04N 7/12* | (2006.01) | |
| *H04N 19/60* | (2014.01) | |
| *H04N 7/18* | (2006.01) | |
| *H04N 5/44* | (2011.01) | |
| *H04N 5/38* | (2006.01) | |
| *H04N 19/167* | (2014.01) | |
| *G06K 9/62* | (2006.01) | |
| *H04W 4/18* | (2009.01) | |

(52) U.S. Cl.
CPC ............ *G10L 15/142* (2013.01); *G10L 15/24* (2013.01); *G10L 19/0018* (2013.01); *G10L 25/63* (2013.01); *H04N 5/38* (2013.01); *H04N 5/44* (2013.01); *H04N 7/185* (2013.01); *H04N 19/167* (2014.11); *H04N 19/60* (2014.11); *H04W 4/18* (2013.01)

(58) Field of Classification Search
CPC ...... H04N 19/25; H04N 19/167; G06T 13/00; G06K 9/62; G06K 9/627; G06K 9/00456; G06K 9/00892; G06K 9/46; G05B 2219/24097
USPC ............ 348/158, 78, 723, 725, 86; 345/473; 375/240.18; 382/115, 128, 181, 224, 243, 382/116, 190, 218; 455/466, 557; 709/206; 370/239

See application file for complete search history.

(56) References Cited

U.S. PATENT DOCUMENTS

| | | |
|---|---|---|
| 6,366,885 B1 | 4/2002 | Basu et al. |
| 6,449,595 B1 | 9/2002 | Arslan et al. |
| 6,539,354 B1 | 3/2003 | Sutton et al. |
| 6,735,566 B1 | 5/2004 | Brand |
| 6,813,607 B1 | 11/2004 | Faruquie et al. |
| 6,826,530 B1 | 11/2004 | Kasai et al. |
| 6,970,820 B2 | 11/2005 | Junqua et al. |
| 7,248,677 B2 | 7/2007 | Randall et al. |
| 7,298,256 B2 | 11/2007 | Sato et al. |
| 7,636,662 B2 | 12/2009 | Dimtrova et al. |
| 7,664,645 B2 | 2/2010 | Hain et al. |
| 8,224,652 B2 | 7/2012 | Wang et al. |
| 2001/0016008 A1* | 8/2001 | Bahl ................ H04N 21/23655 375/240.18 |
| 2001/0026631 A1* | 10/2001 | Slocum ................ A61B 5/1176 382/115 |
| 2002/0034319 A1* | 3/2002 | Tumey ............... G06K 9/00087 382/116 |
| 2002/0120450 A1 | 8/2002 | Junqua et al. |
| 2003/0018475 A1 | 1/2003 | Basu et al. |
| 2004/0218827 A1* | 11/2004 | Cohen ................ G06K 9/00248 382/243 |
| 2005/0203743 A1 | 9/2005 | Hain et al. |
| 2007/0082700 A1* | 4/2007 | Landschaft ............. H04L 12/66 455/557 |
| 2007/0254684 A1 | 11/2007 | Jiang |
| 2009/0252481 A1 | 10/2009 | Ekstrand |
| 2010/0217817 A1* | 8/2010 | De Boer ................ H04L 12/58 709/206 |
| 2010/0232384 A1* | 9/2010 | Farajidana ............. H04L 5/005 370/329 |
| 2010/0296571 A1 | 11/2010 | El-Saban et al. |
| 2010/0302254 A1* | 12/2010 | Min ..................... G06F 17/214 345/473 |
| 2011/0050878 A1* | 3/2011 | Wells .................... H04N 7/181 348/86 |
| 2011/0115799 A1 | 5/2011 | Imbruce |
| 2011/0234825 A1 | 9/2011 | Liu et al. |
| 2013/0124206 A1 | 5/2013 | Rezvani et al. |
| 2014/0064578 A1* | 3/2014 | Choe ..................... G06K 9/3233 382/128 |

FOREIGN PATENT DOCUMENTS

| | | |
|---|---|---|
| JP | 2007279776 A | 10/2007 |
| JP | 2010277588 A | 12/2010 |
| KR | 10-2007-0117195 | 12/2007 |

OTHER PUBLICATIONS

Cootes, T.F et al. 2004, "Statistical Models of Appearance for Computer Vision", Technical Report, University of Manchester, 125 pages.
Cootes, T. et al. 1998, "Active Appearance Models", *Proc. European Conf. Computer Vision*, 2:484-489.
Volker, Blanz et al. 1999, "A Morphable Model for the Synthesis of 3d Faces", In *Proceedings of the 26th Annual Conference on Computer Graphics and Interactive Techniques*, pp. 187-194. ACM Press/Addison-Wesley Publishing Company.
SchJolkopf, B., et al.1998, "Nonlinear Component Analysis as a Kernel Eigenvalue Problem", Neural Computation 10 (5), pp. 1299-1399.
Freund, Yoav et al. 1996, "Game Theory, On-line Prediction and Boosting", In *Proceedings of the Ninth Annual Conference on Computational Learning Theory*, pp. 325-332.
Viola, P. et al. 2001, "Rapid Object Detection Using a Boosted Cascade of Cimple Features", *Coference on Computer Vision and Pattern Recognition (CVPR)*.
Linde,Y.et al. 1980, "An Algorithm for Vector Quantizer Design", *IEEE Transactions on Communications*, pp. 702-710.
Paliwal, K.K. et al. 1995, "Quantization of LPC Parameters", in Speech Coding and Synthesis, Amsterdam: Elsvier Science B. V.
Spanias, A.S. 1994, "Speech Coding, a Tutorial Review", Proceedings of IEEE.
Wai C. Chu, 2003, "Speech Coding Algorithms: Foundation and Evolution of Standardized Coders", John Wiley and Sons.
Lopez-Sole, Juan M. et al. 2001, "Linear Inter-frame Dependencies for Very Low Bit-rate Speech Coding", Speech Communication 34, pp. 333-349.
Rabiner, L.R. 1989, "A Tutorial on Hidden Markov Models and Selected Applications in Speech Recognition", Proceedings of IEEE.
Klein, W. et al. 1970, "Vowel Spectra, Vowel Spaces, and Vowel Identification", Journal of Acoustical Society of America, vol. 48.
Extended European Search Report dated Mar. 26, 2015, for European Patent Application No. EP 12782015.7 filed May 4, 2012, 15 pages.
Notice of Allowance dated Mar. 18, 2015, for U.S. Appl. No. 13/464,915 of Rezvani, B., et al., filed May 4, 2012.
International Search Report PCT/US2011/066811 dated Aug. 17, 2012, pp. 1-3.
Written Opinion PCT/US2011/068811 dated Aug. 17, 2012, pp. 1-4.
Chuang, E., et al., Head Emotion, Stanford Computer Science Technical Report, CSTR Feb. 2003 Apr. 7, 2003 Apr. 10, 2003.
Huang, F. J., et al., "Real-time lip-synch face animation driven by human voice," IEEE Multimedia Signal Processing Workshop, Los Angeles, California, 1998.
Matthews, I. et al., Extraction of Visual Features for Lipreading, *IEEE Transactions on Pattern Analysis and Machine Intelligence*, 24(2):198-213, Feb. 2002.
Li, N., et al., "Lipreading Using Eigensequences," in *Proc. Int. Workshop Automatic Face Gesture Recognition*, pp. 30-34, 1995.

(56) References Cited

OTHER PUBLICATIONS

Bregler, C., et al., Video Rewrite: Driving Visual Speech with Audio, Interval Research Corporation, *Proceedings of ACM SIGGRAPH 97*, pp. 1-8, Aug. 1997.
Blanz, V., et al., A Morphable Model for the Synthesis of 3D Faces, *Proceedings of the 26th Annual Conference on Computer Graphics and Interactive Techniques*, ACM Press/Addison-Wesley Publishing Co., pp. 187-194, 1999.
Co-Pending U.S. Appl. No. 13/464,915 of Rezvani, B., filed May 4, 2012.
International Search Report PCT/US2012/036679 dated Nov. 23, 2012, pp. 1-3.
Written Opinion PCT/US2012/036679 dated Nov. 23, 2012, pp. 1-4.
Non-Final Office Action dated Oct. 24, 2014, for U.S. Appl. No. 13/464,915 of Rezvani, B., et al., filed May 4, 2012.
Supplementary Partial European Search Report dated Dec. 18, 2014, for European Patent Application No. EP 12782015.7 filed May 4, 2012, 5 pages.
First Office Action with Search Report dated Jan. 25, 2016, for Chinese Patent Application No. 201280033415.8, 35 pages.
Notification of Reasons for Refusal dated Jan. 22, 2016, for Japanese Patent Application No. 2014-509502, 7 pages.

\* cited by examiner

VIDEO TRANSMISSION AND SHARING OVER ULTRA-LOW BITRATE WIRELESS COMMUNICATION CHANNEL

RELATED APPLICATIONS

This application claims the benefits of U.S. provisional application No. 61/426,441, filed on Dec. 22, 2010, U.S. provisional application no. 61/483,571, filed on May 6, 2011, and U.S. provisional application No. 61/544,123, filed on Oct. 6, 2011, which are incorporated herein by reference.

FIELD OF THE INVENTION

At least one embodiment of the present invention pertains to video compression and distribution application, and more particularly, to a video compression application and system for compressing and transmitting video based on shared information and its content over an ultra-low bit rate channel

BACKGROUND

A digital video sequence can contain a very large amount of data. In order to transfer a video efficiently using current technology, a large transmission bandwidth is needed. However, wireless data transmission bandwidth is a limited and sometimes expensive resource. Consequently, it is desirable to use compression techniques to encode the video using fewer bits than the original video contains. The compressed video should effectively reduce the bandwidth required to transmit the video via networks.

It is desirable to compress a video in a highly efficient way so that the video can be transmitted through an ultra-low bit channel, such as a SMS channel. Short message service ("SMS"), sometimes called "texting," is one of the most popular person-to-person messaging technologies in use today. SMS functionality is widely available in almost all modern mobile phones. However, SMS has a very limited capacity to transmit information; each SMS message has a fixed length of 140 bytes or 160 characters. Multimedia messaging service ("MMS") is another possible way to send messages that include multimedia content. However, MMS messaging cannot utilize existing SMS infrastructure; so it costs more than SMS messaging. There is no mechanism today to effectively send a video message with ultra-low bandwidth on wireless channel, particularly on very low bandwidth channels such as an SMS channel.

For speech compression, a large body of work in the past four decades has been done analyzing various concepts in speech compression. In a typical voice compression technique for wireless communications such as ITU G.723, FS MELP, a voice record is analyzed for its correlation property in the acoustical sense. The speech compression programs are typically based on waveform coders, such as Code Excited Linear Prediction ("CELP") algorithm. While a number of approaches in the past have resulted in very low bit rates 200-300 bps, the voice quality has been compromised. The mean opinion score ("MOS") factor of compressed voice record typically is about 2, wherein the MOS provides a numerical indication of the perceived quality from the users' perspective of the voice record after compression. It is desirable to have a method to compress and transmit the voice record in a very low bit rates while maintaining a high voice quality, with an MOS factor between 4 or 5.

SUMMARY

The technology introduced here includes a "cognitively aware" technique to transmit video over an ultra-low bandwidth channel, such as an SMS channel. By "ultra-low" bandwidth, what is meant is a channel that supports a data rate of no more than 6,500 bits per second (bps) A "cognitively aware" method, in the context of this description, is a method that takes into consideration the levels of importance and interest of different spatial regions depicted in a video sequence, to a real or hypothetical human viewer. The use of "cognitive awareness" in this way allows key portions of a video sequence to be identified and sent over a communication link while less important portions of the video sequence are not transmitted, or transmitted with lower fidelity. The technique further provides for synthesizing, at a receiving device, a high-quality approximation (called a "copy" herein) of the original video sequence, based on the relatively small amount of information that is transferred over the link. This is done while still providing an appropriate amount of resolution for a high quality video synthesis, while keeping the number of bits per frame low enough to permit use of an ultra-low bitrate channel (such as SMS) to transmit the video.

In one embodiment, an ultra-compact video file is generated based on an ultra-low bandwidth video with data rate less than 6500 bps. The ultra-compact video file may be embedded in an e-mail; and the email may be sent asynchronously at a later time over wireless links such as mobile or satellite channels to at least one receiver. Such ultra-compact files allow for large distribution of video content and help preventing wireless networks from congestion or network outage. The ultra-compact file may not include the original video sequence but carry specific data for video regeneration or synthesis.

In certain embodiments, a set of parameters are developed from a video region of a high interest, wherein the parameters represent a mapping function of a database to model the video region. The set of parameters is transmitted over the ultra-low bandwidth channel to a remote device, wherein the remote device also has access to an instance of the database. The remote device synthesizes the video by using the mapping function of the database, which is represented by the transmitted set of parameters The technology further includes a method for segmenting, modeling, transmitting and synthesizing a video. The method comprising capturing a video sequence at a mobile communication device; segmenting each frame of the video sequence into a plurality of regions; evaluating each of the plurality of regions based on the database and recognizing a cognitively visually important region of the plurality of regions based on a result of said evaluating; developing a data sequence based on the cognitively visually important region in the frames of the video sequence; sending the data sequence representative of the video sequence from the mobile communication device to a remote device over a wireless communication link in an ultra low bit rate channel; receiving the data sequence at the remote device; and synthesizing the video sequence based on the data sequence and a database mutually available to both the mobile communication device and the remote device. The database may include a visual characteristics model of a person. The data sequence may represent a time series of mapping functions of the database; the mapping functions model visual characteristics of a person.

Other aspects of the technology introduced here will be apparent from the accompanying figures and from the detailed description which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not necessarily all refer to the same embodiment.

A cognitively aware method for segmenting, modeling, transmitting and synthesizing video is described herein, wherein the video has one or more regions in which a viewer has some level of interest. The viewer may be a real or hypothetical human viewer. In this disclosure, a "cognitively aware" method is a method that automatically segments frames of a video into regions of various levels of importance or interest to a real or hypothetical human viewer and where the viewer may have some a priori knowledge about the video. The cognitively aware method further provides an appropriate amount of resolution for a high quality video synthesis, while keeping the number of bits per frame low enough to permit use of an ultra-low bitrate channel (such as SMS) to transmit the video to a receiver. Accordingly, an important aspect of the technique introduced here is recognition that it may not be necessary to encode or transmit regions that are likely to be of low interest to a human viewer. The video frames are partitioned into regions of varying degree of interest where different methods are used for compression for different regions. In regions of high interest, low bitrate is achieved using precise knowledge of the nature of the region. In lower interest regions lower bitrate may be achieved by accepting lower resolution for these regions. Accordingly, bandwidth can be conserved by segmentation of frames into regions and sending data suitable for these regions over the communication channel. The receiver receives this data and synthesizes an instance of the video at the receiver side with the quality of synthesis for a segment in a frame being dependent on interest level of the segment.

Video chatting and video messaging are applications that can benefit from low bandwidth video encoding and transmitting. In one example, a video message contains image content that depicts an individual's head and shoulders while the individual is talking in front of a camera. The video sequence may be captured by a camera of a mobile communication device, such as a mobile phone.

Figure 1:
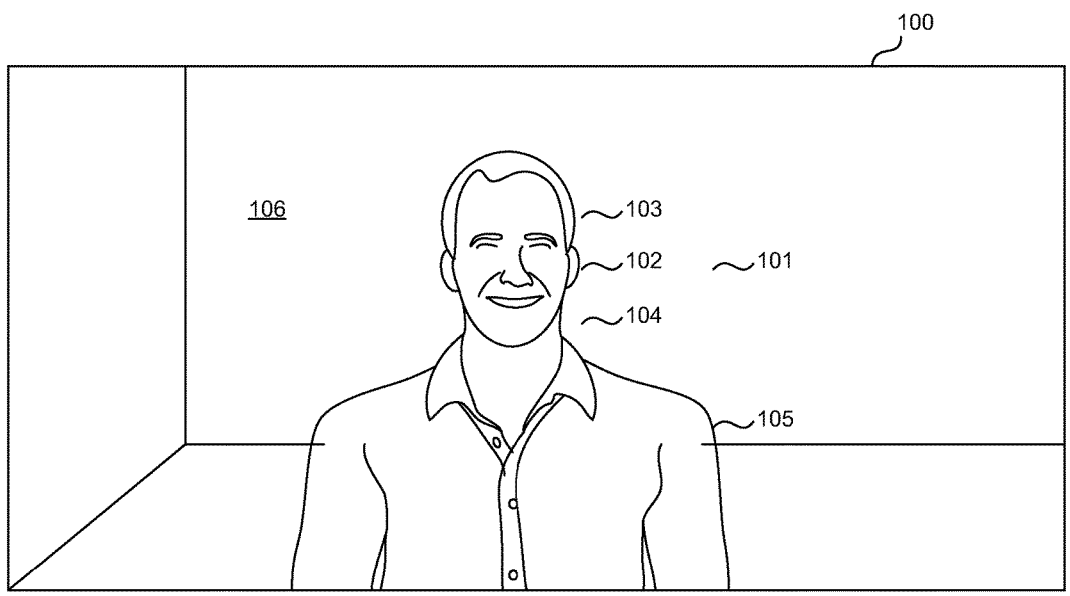
FIG. 1 illustrates an example of a frame of a video message containing regions of various interest levels.

FIG. 1 illustrates an example of a frame of the video message. In the frame 100 of the video message, the region of high interest level ("RoHI") (to a human viewer) is the face 102 of the individual 101, particularly the lips and the eyes of the individual. A region of high interest level means that the region has cognitive visual importance from a real or hypothetical human viewer's perspective. A region of medium interest level ("RoMI") includes the hair 103, neck 104 and shoulders 105 of the individual 101. A region of low interest level ("RoLI") includes the rest of the video frame, such as the background 106. A region of a high interest level is a "cognitively visually important" region, i.e. a region having visual importance from a real or hypothetical human viewer's perspective. This segmentation is an example of segmentation of video frames into regions of varying interest.

The cognitively aware method utilizes a cognitive dictionary which is an adaptive learning repository of databases and codebooks that contain audio and visual information about a person or a group of people and their interactions with an environment. The audio and visual information is represented by elementary functional models associated with statistical, semantic, situational markers. These statistical, semantic, situational markers provide contextually aware information of the video in a compact form for transmission. The database may include one or more visual characteristics models of human.

The regions of various interest levels of a video are encoded (compressed) using different techniques described in the following paragraphs. The video message example illustrated in FIG. 1 is referred to only for illustration purposes when explaining the techniques. A person having ordinary skill in the art will readily be able to apply the techniques to encode videos in scenarios different from the example. After the regions of various interest levels of the video are encoded at a transmitter side, the encoded data sequence is transmitted to a receiver side. The data sequence may be transmitted over a wireless communication link in an ultra-low bit rate channel, such as an SMS channel. The regions are synthesized and "stitched together" to synthesize an instance of the video at the receiver side. The transmitter, receiver, or both can be mobile communication devices, such as smartphones. Alternatively, the technique can be employed by other types of devices, such that neither the transmitter nor the receiver is necessarily a mobile device. For example, the technique could be implemented between two personal computers (PCs), or between a PC and a mobile device, and/or other types of devices capable of transmitting or receiving video. Any of these devices can be a transmitter or a receiver. The wireless transmission link could be any wireless medium and protocols including, but not limited to, mobile phone networks, terrestrial TVs, satellite channels, AM and FM radios, and amateur radios.

Once the high interest region is identified in an initial frame, an initial guess for the mapping function for the first frame of the video is used in order to initiate an iterative algorithm to find the best mapping function. The mapping function is explained in detail in the following paragraphs.

Figure 2:
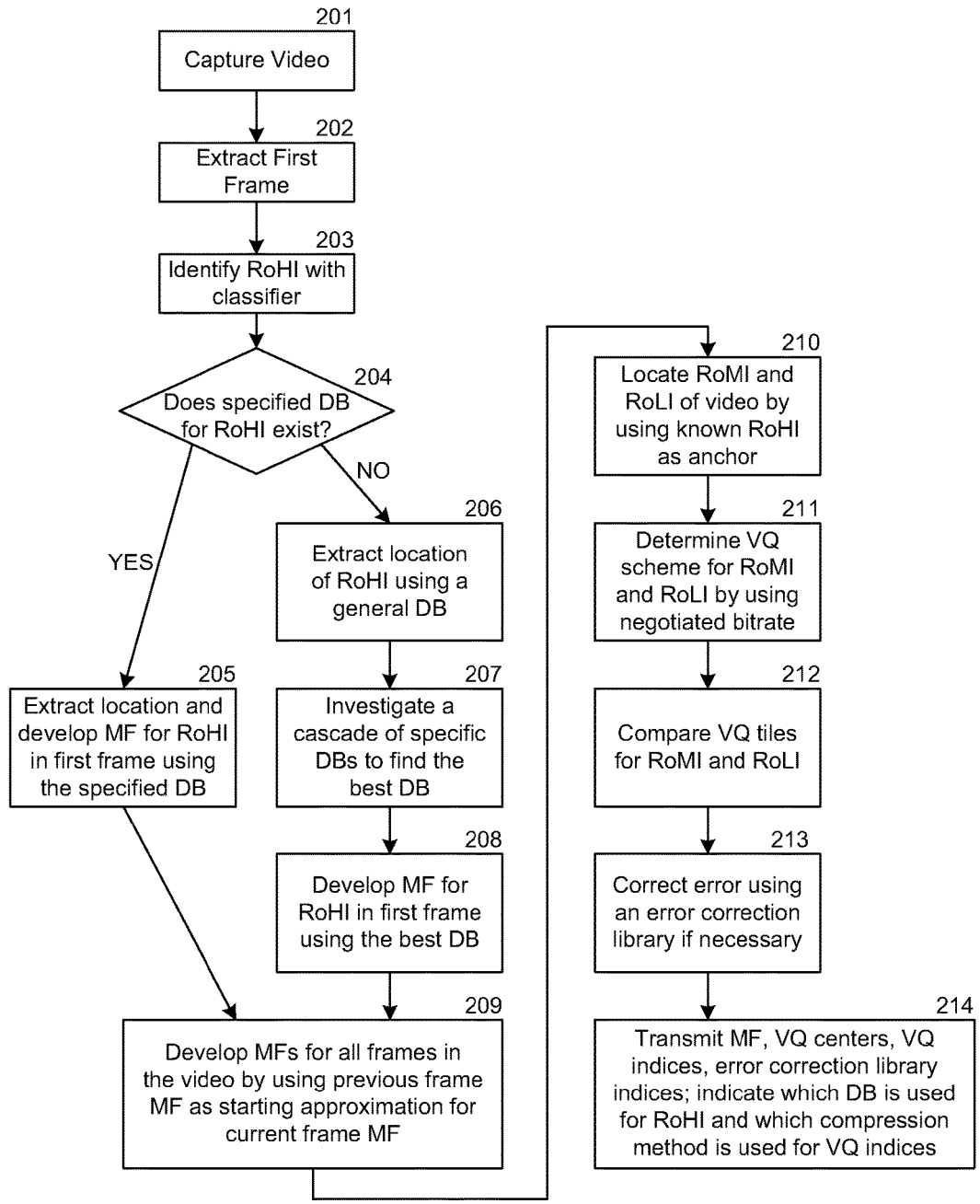
FIG. 2 illustrates an example of a process of a transmitter segmenting, modeling, and transmitting a video.

FIG. 2 illustrates an example of a process of a transmitting user device ("transmitter") segmenting, modeling, and transmitting a video. The transmitter captures or otherwise inputs a video at step 201. The first frame of video is extracted (202) for initial approximation of a region of high interest level (RoHI). A classifier, such as a discriminative classifier, can be used to solve the initial approximation and identify the RoHI in the first frame (203). Thus, a region having cognitive visual importance from a real or hypothetical human viewer's perspective identifying, is identified by a processor. The databases ("OBs") are searched in order to find an individual specific database that matches the identified RoHI (204). If an individual specific database is matched, the database is used to extract the location of the RoHI and develop the mapping function ("MF") for the RoHI in the first frame (205). If there is no matched individual specific database, the location of the RoHI is extracted using a general database (206). Then a cascade of specific databases is examined to select a best database to model the RoHI (207), which is disclosed in details in following paragraphs. The selected database is used to extract the location of the RoHI and develop the mapping function for the RoHI in the first frame (208). The mapping function of the second frame is developed by using the mapping function of the first frame as a starting approximation of an interactive optimization. Similarly, a mapping function of each frame of the video is developed by using the mapping function of the previous frame as a starting approximation (209). Then, since the location of the RoHI is identified, The RoMI and RoLI of the video are located by using the RoHI as anchor (210). The compression of RoMI and RoLI can be implemented using any standard video compression methods. For example, in steps 211-213, the RoMI and RoLI are compressed by vector quantization ("VQ") method, which is disclosed in detail in following paragraphs. Optionally, an error concealment library can be utilized to further fine-tune the modeling of the video (213). The mapping functions are transmitted along the compressed RoMI and RoLI video data (214). An indication of which database is used is also transmitted to instruct the receiver synthesizing the video using the appropriate database. The low bitrate is achieved by the low bandwidth and high fidelity in high interest regions using a priori knowledge of the nature of the regions. The low bitrate is further achieved by a priori knowledge about the regions of lower interests to a human viewer that the regions of lower interest does not need to maintain high fidelities.

Figure 3:
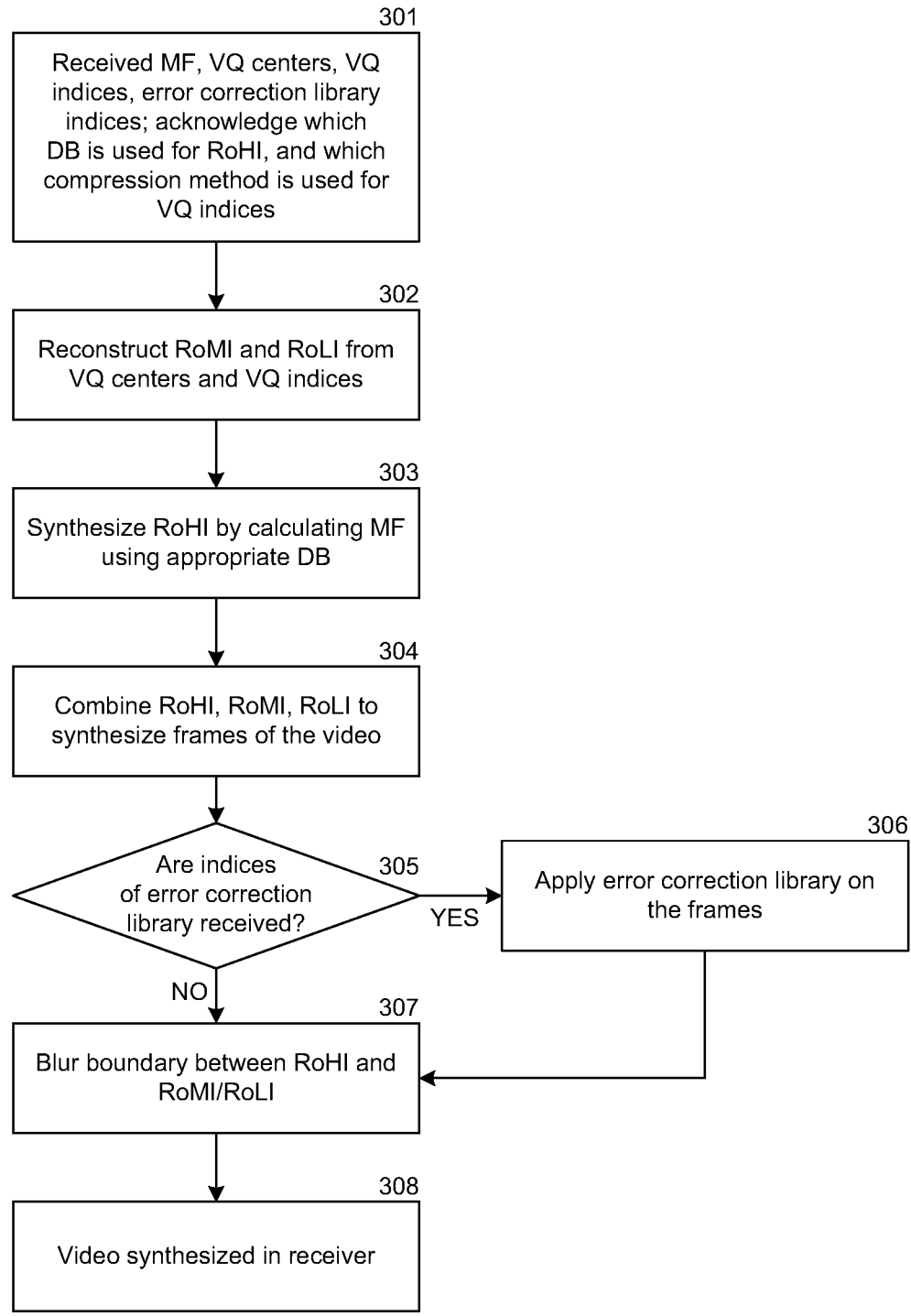
FIG. 3 illustrates an example of a process of a receiver synthesizing a video.

FIG. 3 illustrates an example of a process of a receiving user device ("receiver") synthesizing a video. At step of 301, the receiver receives the transmitted mapping functions, and optionally, the compressed RoMI and RoLI video data. The receiver is also notified of the appropriate database for synthesizing the video. The RoMI and RoLI of the video are decompressed from the transmitted compressed data (302). In some embodiment, there are no received data for RoLI or RoLI; these regions may be reconstructed based on certain assumption by the receiver. RoHI is synthesized by calculating the mapping function using the appropriate database (303). All regions are combined to synthesize the frames of the video (304). If any indices of the error concealment library are received (305), the indexed content from error concealment library is applied on the frames of the video (306). The boundary between RoHI and regions of lower interests are blurred to alleviate a "separation" effect (307). At 308, the video is synthesized in the receiver.

The cognitively aware method of adaptively compressing a video described herein is disclosed in details in following multiple sections of this document:

1. Identifying and Segmenting Regions of Interests
2. Modeling and Synthesis of Regions of High Interest Levels
   2.1. Selection of Database
   2.2. Methods for Modeling High Interest Level Regions
   2.3. Error Concealment Library
   2.4. Further Bitrate Reduction for Non-Real Time Video Transmission
3. Modeling and Synthesis of Regions of Medium and Lower Interest Levels
   3.1. Special Treatment of Low Interest Level Regions
   3.2. Special Treatment of Medium Interest Level Regions
4. Database Synchronization between Transmitter and Receivers
5. Quality of Service (QoS) Selection: Target Bitrate vs. Choice of Modeling Method
6. Regenerating Video by Stitching of Regions
7. Voice modeling and synthesizing
8. Implementation of transmitters, receivers and servers.
1. Identifying and Segmenting Regions of Interests To segment regions of various interest levels, an initial approximation of a region of a high interest level is employed. A discriminative classifier can be trained to solve this initial approximation. An example of a discriminative classifier is the Viola Jones AdaBoost classifier for identifying regions of face and facial features, such as eyes and nose, in an image. Similar approaches are discussed in articles including: "Game theory, on-line prediction and boosting," *Proceedings of the Ninth Annual Conference on Computational Learning Theory*, pages 325-332, 1996, Y. Freund and R. E. Schapire; and "Rapid object detection using a boosted cascade of simple features," *Conference on Computer Vision and Pattern Recognition (CVPR)*, 2001, P. Viola and M. Jones; all of which are incorporated herein by reference in their entireties.

Once the high interest region is identified in an initial frame, an initial guess for the mapping function for the first frame of the video is required in order to initiate an iterative algorithm to find the best mapping function. The mapping function is explained in detail in the following section. For example, if a principle component analysis ("PCA") method is used, some initial guess for the coefficient of the eigenvectors (also referred to as eigen-functions) is required. For the subsequent frames of the video, mapping function for the previous frame may be utilized as an initial guess of the mapping function for the current frame. Through the iterative process of modeling the high interest level region by mapping functions, the high interest region is accurately tracked throughout the length of the video. This knowledge of the evolving boundary of the high interest region is a basis for segmenting the video images into regions with various interest levels.

Identification of boundaries between regions of medium and low interest levels is usually done on a case by case basis. It depends on the relationship between the high, medium and low interest regions. In the video message example as illustrated in FIG. 1, the medium interest level region is defined as hair 103, neck 104 and shoulders 105. Since the method to model the high interest region can accurately locate the face in each frame, the medium interest regions can be located by their relationship to the face. The rest of the video frame belongs to the low interest level region.

2. Modeling and Synthesis of Regions of High Interest Levels

2.1. Selection of Database

Modeling of regions of high interest levels can be done using prior knowledge of what the region represents to viewers. In regard to the above video message example, human viewers easily recognize a face. If the face belongs to an individual who is a celebrity or a person known by the viewer, the face may be recognized immediately by the viewer.

In one embodiment, therefore, to model an individual who has been identified, a database containing images of only this individual is utilized. If the individual in video is not known, a database containing images of different types of faces is utilized to model the face of the individual. Furthermore, if certain information about the individual, such as age range, sex and/or ethnicity, is known, the database may be optimized to contain images of types of faces consistent with the information.

A region of high interest level is usually relatively complex, and the object in the region, for example a face, typically is not rigid. Furthermore, the appearance of the object can vary greatly under different illumination conditions. Therefore, it is useful to provide different databases for different views of the object in the region. For example, there may be a database for a front view of a face and databases for the face turned to the left and right by 45 or 90 degrees. The databases preferably have sufficient commonly shared data to facilitate modeling transitions between views of the object. When there are multiple databases specialized for different views, the motions of the face can be modeled with mapping functions having fewer parameters. Since the parameters are sent from transmitter to receiver for synthesizing high interest region, fewer parameters are needed so that less bandwidth is required for the transmission. When the transmitter transitions the modeling from using one database to another database, the receiver can be notified by receiving a pre-determined code from the transmitter indicating the usage of the new database.

Once an initial approximation of the high interest region is made, as discussed in previous section, the next step is to determine which database to use for computing the corresponding mapping function. In some instances, such as the video message example, the transmitter and the receiver both may be aware that the nature of the high interest region is the face. If the transmitter is a mobile phone device capable of transmitting a video message, the high interest region is generally the face of the user of the mobile phone. A database that corresponds the identity of the face can be used to compute the mapping function of face region of the video on the transmitter, such as a mobile phone; an instance of the same database is used to synthesize an instance of the face region of the video on the receiver.

In some other instances, the nature or identity of the high interest level may not be known. The appropriate database in such instances can be chosen by comparing the high interest region against multiple databases. For example in the case of a face, the regional location of the face can be found by methods such as the ones described above and a mapping function for synthesizing the face based on a general face database is used. Such a general face database may contain images of the faces of many individuals. This technique, therefore, can pinpoint the boundaries and main regions of the face. However, a general face database will not necessarily yield the best face synthesis results.

In another embodiment, for each database, a mapping function of the face is computed based on each database and an image of the face is synthesized based on each mapping function and the corresponding database. The fidelity of the synthesized face can be calculated as the sum of pixel value differences between the original face and the synthesized face, where a lower sum corresponds to a higher fidelity. A specialized database that yields the best fidelity of the synthesized region of the image can be chosen. For example, the face synthesis is tested against databases with different age ranges. If one database with certain age range yields better fidelity than databases with other age ranges, further specialized databases with different ethnicities in that age range may be tested for face synthesis, and so on. Finally, a specialized database that yields a high fidelity of the synthesized face is chosen to model the high interest region, i.e. the face.

Figure 4:
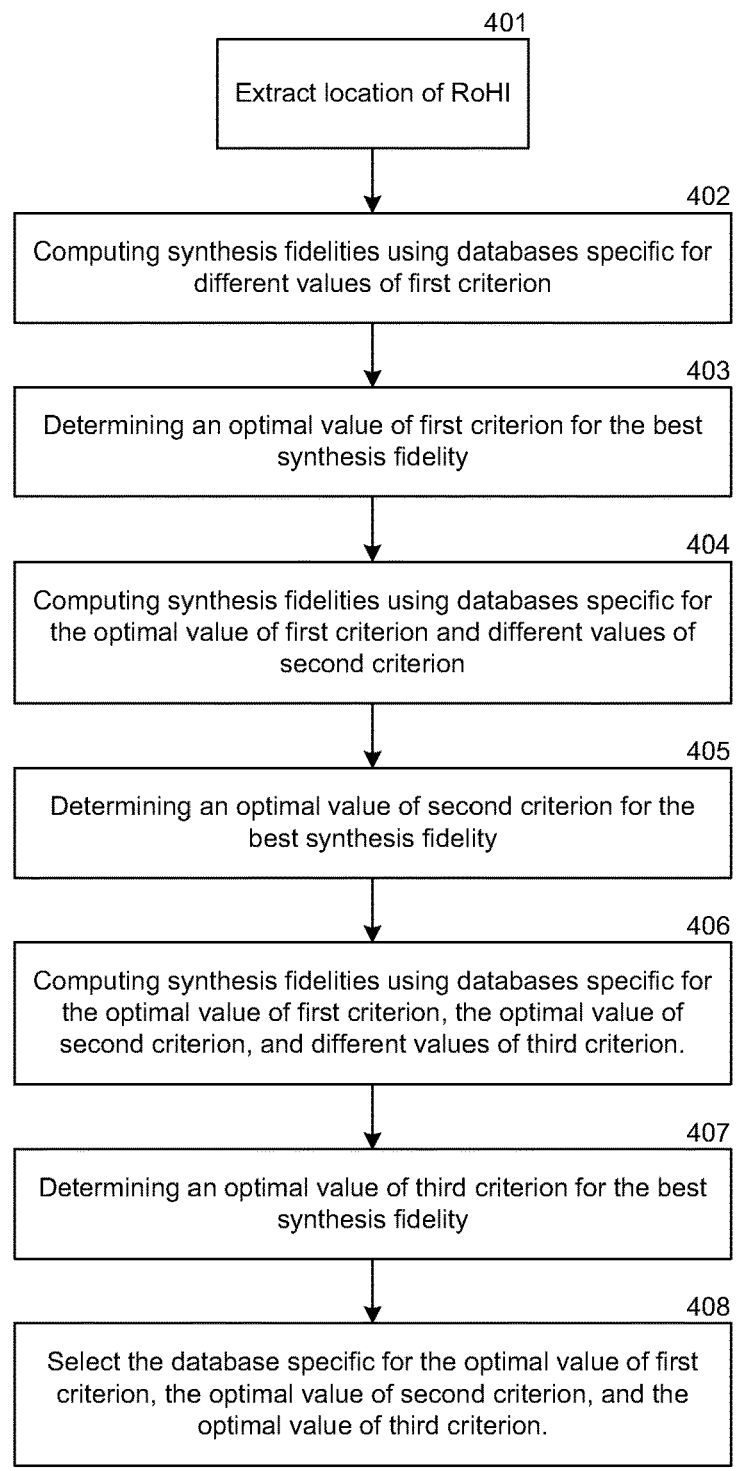
FIG. 4 illustrates an example of a process of a transmitter selecting database for modeling a region of interest of a video.

FIG. 4 illustrates an example of a process of a transmitter selecting database for modeling the RoHI of a video. In the example disclosed in this paragraph, the database is selected by the transmitter. In some other embodiments, as disclosed in following paragraphs, the database may be selected by a server. At the step of 401, the location of the RoHI is identified by a method, such as AdaBoost classifier mentioned in previous paragraphs. At 402, for each database specific for a value of first criterion, a synthesis fidelity of the RoHI is computed. For example, the first criterion may be gender, and the value of the first criterion (gender) can be male or female. The synthesis fidelity ("fidelity") of the RoHI can be calculated by as the sum of pixel value differences between the original RoHI and the synthesized RoHI, where a lower sum corresponds to a higher fidelity. At 403, an optimal value of first criterion for the best synthesis fidelity is determined. For example, the optimal value of first criterion may be female because the database specific for female yields better fidelity than the database specific for male. Then, at 404, for each database specific for the optimal value of first criterion and for a value of second criterion, a synthesis fidelity of the RoHI is computed. For example, the optimal value of first criterion may be female; the second criterion may be age range. Accordingly, each of databases specific for female in age ranges of 20-30, 30-40, 40-50 and 50-60 may be used to compute the synthesis fidelity. At 405, an optimal value of second criterion for the best synthesis fidelity is determined. For example, the optimal value of second criterion may be age range of 20-30 if the database specific for female in age range of 20-30 yields better fidelity than databases specific for female in other age ranges. Then, at 406, for each database specific for the optimal value of first criterion, the optimal value of second criterion, and for a value of third criterion, a synthesis fidelity of the RoHI is computed. For example, the optimal value of first criterion may be female; the optimal value of second criterion may be age range of 20-30; the third criterion may be ethnicity. Accordingly, each of databases specific for female in age ranges of 20-30, and with an ethnicity of Asian, Caucasian or African, may be used to compute the synthesis fidelity. At 407, an optimal value of third criterion for the best synthesis fidelity is determined. For example, the optimal value of third criterion may be Asian if the database specific for Asian female in age range of 20-30 yields better fidelity than databases specific for female in other age ranges with other ethnicities. Therefore, a database specific for the optimal values of first, second and third criteria is selected for modeling the RoHI of the video. For example, a database specific for Asian female in age range of 20-30 may be selected. The sample process in FIG. 3 is for illustration purpose only. An ordinary skilled person in the art will readily apply the principle of the process to select a database using other criteria. The number of criteria may be greater or fewer. Different criteria may be applied in different situations Furthermore, the databases can be updated and supplemented when more videos are received and processed. For example, as more videos of a particular user are captured by the transmitter, a more specialized database for the user can be constructed.

2.2. Methods for Modeling High Interest Level Regions

The databases in at least some embodiments are shared between the transmitter and the receiver. The general idea of compressing the high interest region is to model an instance of the region as a time series of mapping functions for an appropriate database for the region. Using the above video message example, an instance of the face of an individual of a known age range, sex and ethnicity can be synthesized using a time series of mapping functions for a database of faces matching this age range, sex and ethnicity. For each frame, the transmitter computes a mapping function for the appropriate database, wherein each mapping function is represented as a set of parameters. The transmitter sends a time series of sets of parameters representing the time series of the mapping functions over to the receiver. A time series of sets of parameters is a sequence of the parameter sets, wherein the parameter sets correspond to the frames of the video at successive times spaced by time intervals. The receiver then uses these mapping functions, which are represented by the parameters, to synthesize an instance of the face. The synthesis of the high interest level region is feasible because the receiver also has access to an instance of the same database.

The highly efficient compression of the high interest level region results from two facts. First, the number of bits for the parameters needed to be transmitted to represent the mapping functions is much smaller than the bit size of the video data of the region compressed by conventional methods such as JPEG or MPEG. Second, the databases are specialized to model a known region of interest, such as a face of an individual. Therefore, the number of the parameters required to synthesize the region is low.

In certain embodiments, the mapping functions are parameterized. For example, the parameters can be coefficients for a set of basis functions that are stored in a dictionary. The receiver receives the parameters from the transmitter and recreates the mapping functions to synthesize the high interest region, based on the dictionary available to the receiver.

In one example, the database contains images that are representative of the high interest region. An instance of a high interest region of a frame can be synthesized by a combination of images in the database. One simple example of a mapping function is a function that synthesizes the region of interest as a linear combination of the database images. Thus, the mapping function in this case can be represented by the linear coefficients from the linear combination. This simple example is provided for illustrative purpose only. More efficient compression methods are disclosed in the embodiments in following paragraphs.

Figure 5:
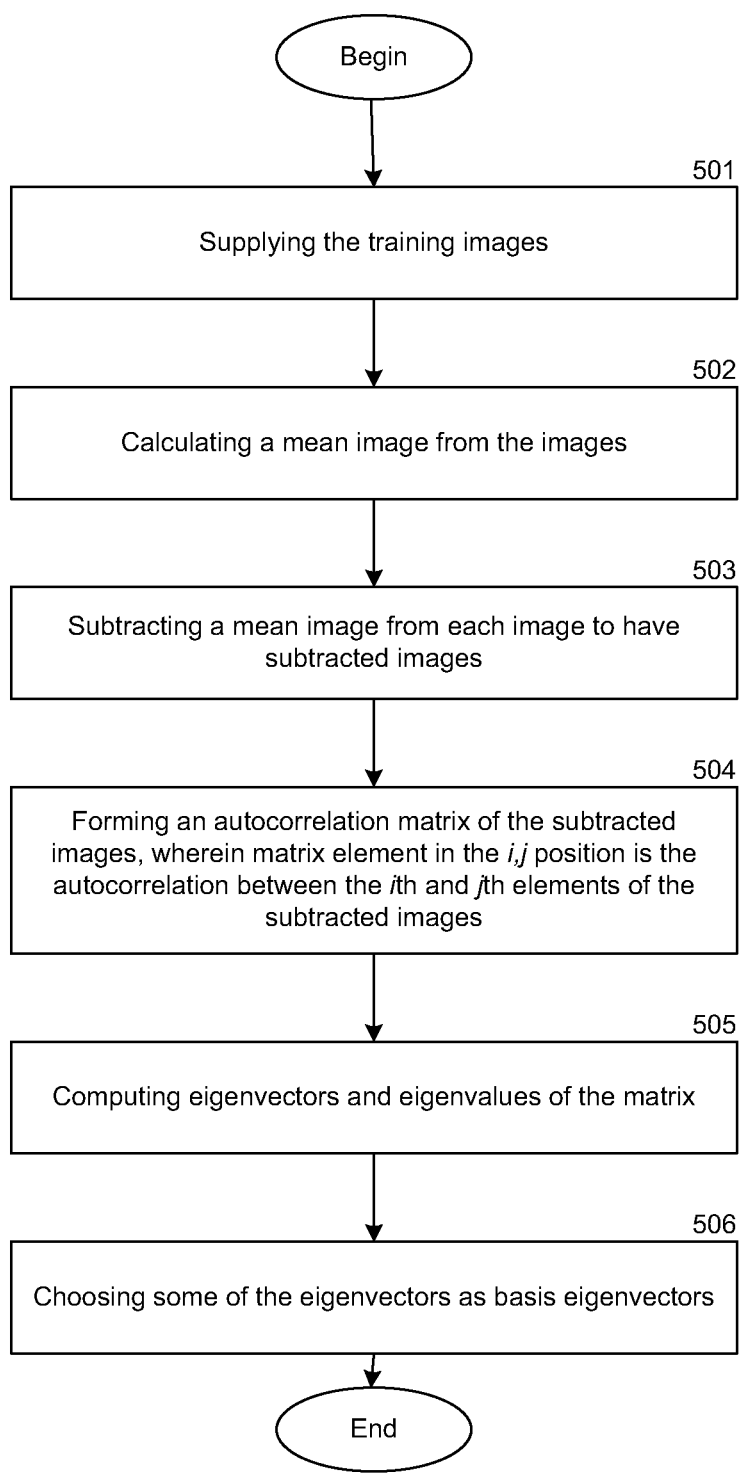
FIG. 5 illustrates an example of a process of computing eigenvectors according to a principle component analysis (PCA) method.

In one embodiment, a method called principle component analysis ("PCA") is utilized for modeling the RoHI. In the embodiment disclosed in this paragraph, the method is executed within the transmitter, such as a smartphone or a PC. In some other embodiments, the method may be executed within a server. FIG. 5 illustrates an example of a process of computing eigenvectors according to the PCA method. A plurality of training images is supplied to the transmitter either from a training video, or from a database (501). The training video may be a video of an individual for the purpose of building a database specific for the individual or it may be a pre-existing video created for another purpose. The images can be individual frames of video, for example. A mean image (also referred to as average image, or mean vector) is calculated from the images (502). The mean image is then subtracted from the individual images to produce a plurality of subtracted images (503). These subtracted images have a mean image of zero. At 504, the autocorrelation matrix of these zero mean images is computed. A matrix of the training data is formed where each row of the matrix represents one training image. The product of this matrix with its transpose is the autocorrelation matrix. The eigenvectors of the autocorrelation matrix are the basis functions, while the magnitude of the corresponding eigenvalue is an indication of the importance of the eigenvectors. Because the region of interest has constraints on its pixels, e.g. the region represents the face of a person of known age, sex, and/or ethnicity; the mean image plus a linear combination of a few chosen eigenvectors (referred to as basis eigenvectors) from these eigenvectors are sufficient to represent an instance of region of interest with great accuracy (506). In one embodiment, eigenvectors with the largest associated eigenvalues are chosen as basis eigenvectors, since an eigenvalue represents how far a corresponding eigenvector is from the mean image.

The "training" of the basis eigenvectors can be carried out offline and is independent of the encoding process. For example, a training video can be captured and the frames in the training video utilized as images to generate the basis eigenvectors in the manner described above. In one embodiment, the basis eigenvectors are included in a database specific for an individual, for encoding videos from the individual in the future.

Figure 6:
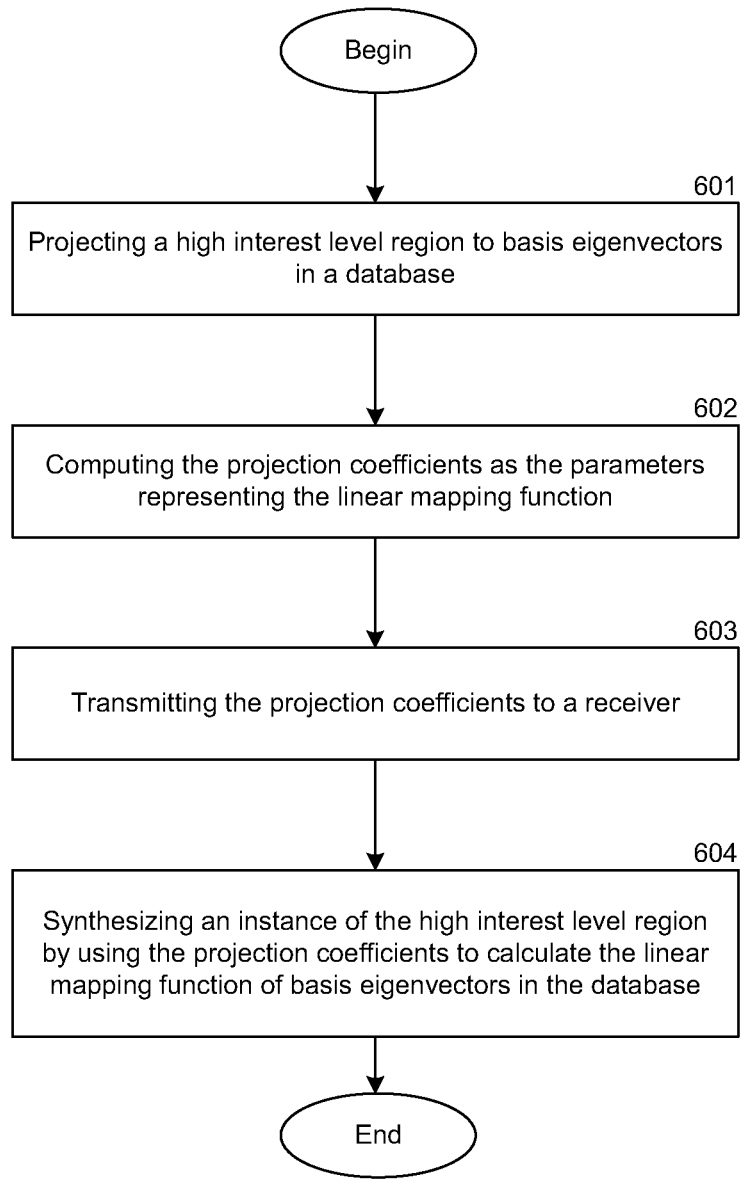
FIG. 6 illustrates an example of a process of encoding and synthesizing a region of a video based on basis eigenvectors in a database.

FIG. 6 illustrates an example of a process of a transmitter encoding a region in a video sequence and a receiver synthesizing the region in the video sequence, based on the basis eigenvectors in the database. A high interest level region in each frame of a video is projected to the basis eigenvectors (601). The region is then mapped as a linear function of the basis eigenvectors. In this case, the projection coefficients are computed as the parameters representing the mapping function (602), which is a linear mapping function in this embodiment. The parameters, i.e. the projection coefficients, are transmitted to a remote device or a receiver (603). The receiver also has access to an instance of the same database containing the same set of basis eigenvectors. At 604, the receiver synthesizes the high interest level region by calculating a linear combination of the basis eigenvectors in the database, wherein each of the projection coefficients is the linear coefficient for the corresponding basis eigenvector.

In a related embodiment, an enhancement of this method is to model the shape and the texture of the high interest region separately. This leads to an even smaller number of mapping functions for the modeling. Similar approaches are discussed in articles including: "On Lines and Planes of Closest Fit to Systems of Points in Space," *Philosophical Magazine* 2 (6): 559-572, 1901, by K. Pearson; "Statistical Models of Appearance for Computer Vision," *Technical Report*, University of Manchester, 125 pages. 2004, by T. F. Cootes, C. J. Taylor; "Active appearance models," *Proc. European Conf. Computer Vision,* 2:484-489, 1998, by T. Cootes, G. Edwards, and C. Taylor; and "A morphable model for the synthesis of 3d faces," *Proceedings of the 26th annual conference on Computer graphics and interactive techniques*, pages 187-194. ACM Press/Addison-Wesley Publishing Co., 1999, by V, Slant and T. Vetter; all of which are incorporated herein by reference in their entireties.

Images in a database can be thought of as points in a high-dimensional space. Each color component of a pixel in the image represents one axis of the high-dimensional space. The dimensionality of this space is thus the number of pixels times the number of colors (three) used to construct the image. For an image of a 640×480 resolution, the dimensionality of the space is 640×480×3=921,600. In the PCA method described above, the assumption is that because of the particular structure of the region of interest, all instances of the region of interest lie on a linear subspace having a dimensionality much lower than 921,600, or at least the subspace is very close to a linear subspace. Although the assumption leads to practically useful results, points representing instances of the region of interest do not necessarily lie in a linear subspace. Furthermore, points lying in a linear subspace are not necessarily the most efficient representation of instances of the region of interest, in terms of bitrate.

A manifold method can take advantage of the observation of the preceding paragraph for even better compression. Using knowledge of the structure of the images, it is possible to locate the region of interest on a manifold in the space, wherein the manifold has much lower dimensionality than the dimensionality of the space. Therefore, the region of interest is represented by points on the manifold, and requires fewer mapping functions for the database to achieve the representation. Similar approach is discussed in the article of "Nonlinear component analysis as a kernel eigenvalue problem," *Neural Computation* 10 (5), 1299-1399, 1998, B. SchJolkopf, A. J. Smola and K, MJuller, which is incorporated herein by reference in its entirety.

Figure 7:
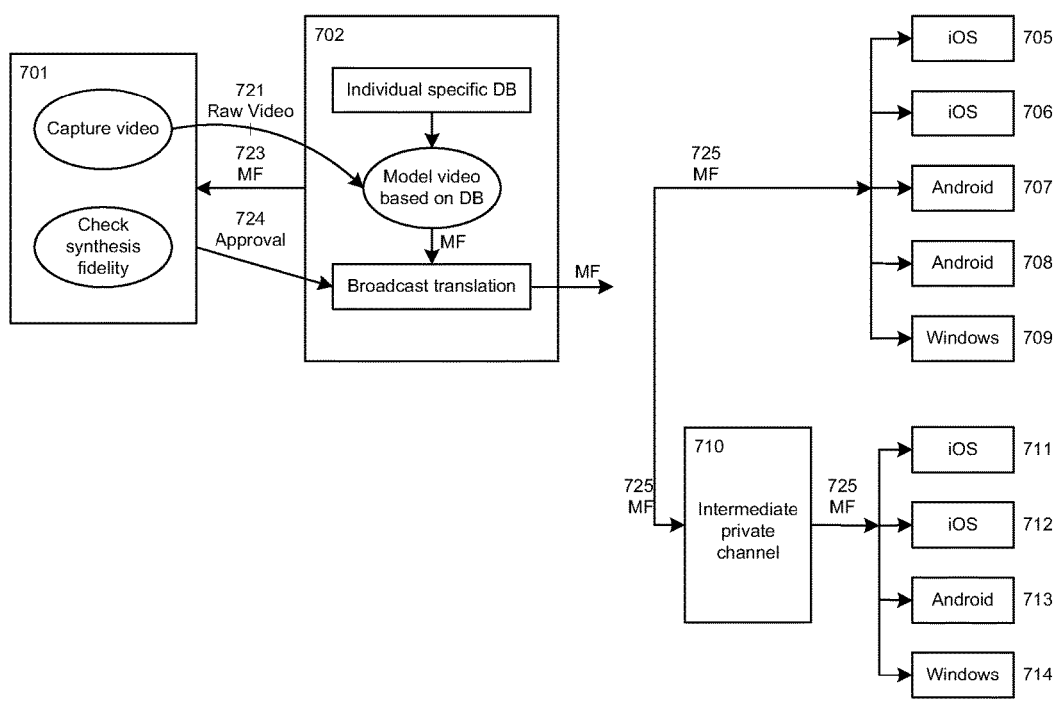
FIG. 7 illustrates an example of a server segmenting and modeling a video.

In some embodiments mentioned above, a video is segmented and modeled by the transmitter. In some other embodiments, the video may also be segmented and modeled by a server. For example, a video compressed by a know method such as H.264 is sent to the server: the video at the server is then modeled by the server and sent to a large number of receivers through ultra-low bandwidth channels. FIG. 7 illustrates an example of a server segmenting and modeling a video. A transmitter 701 acquires (i.e., captures or otherwise receives inputs) a video of an individual and sends the raw video 721 to a server 702. The raw video 721 may be generated and encoded in transmitter 701 using a standard video format supported by the hardware and software of the transmitter 701. The server 702 receives the raw video 721 and models the video based on a database specific to the individual. Mapping functions 723 are developed based on any methods disclosed in other embodiments. The mapping functions 723 are sent back to the transmitter 701. The transmitter 701 synthesizes the video using the mapping functions, and calculates the synthesis fidelity of the mapping function in a similar way as disclosed in FIG. 4 and corresponding paragraphs. If the fidelity is determined to be acceptable by transmitter 701, transmitter 701 sends an approval message 724 to the server 702. Upon receiving approval message 724, the server 702 sends out (multicast) the mapping functions to one or more receivers. In some embodiments, the receivers may have different versions of the database. Then the server translates the mapping functions accordingly for different versions of databases, and sends out to corresponding receivers. The versions of databases and the translation are discussed in details in FIG. 8 and corresponding paragraphs. The mapping functions 725 may be transmitted directly to a plurality of receivers 705-709. Receivers 705-709 may have different operating systems, such as iOS, Android, or Windows. The mapping functions 725 may be transmitted through an intermediate private channel 710 and relayed to a plurality of receivers 711-714. An intermediate private channel 710 may be a communication channel provided by an online social media service, such as Facebook or Twitter. Comparing to sending out the raw video to all receivers, the disclosed method achieves a great saving in bandwidth.

2.3. Error Concealment Library

Typically the chosen database is adequate for the transmitter to model the region of high interest level. But sometimes it may be desired to have additional information, to further reduce the difference between the original region in the video and the synthesized instance of the region. The transmitter and the receiver can share an error concealment library containing some image patches, or sets of image transformation operations, or a combination thereof. The difference between the original region in the video and the synthesized instance of the region can be further reduced by finding a patch or an image transformation operation that matches the difference. Then an index to the patch or the image transformation operation can be sent over to the receiver for a better synthesis of the region. Because the databases are constantly being updated, eventually the databases will be updated to be capable of modeling the difference, and the error concealment library will be needed to a lesser degree.

In one embodiment, the error concealment library is utilized to model an individual's facial hair changes. The existing database might not contain any images of the individual wearing a mustache. A new video of the individual having a mustache needs to be modeled, transmitted and synthesized. Image shows a synthesized instance of a frame of the video using only the existing database. An index to an image patch of a mustache from the error concealment library can be transmitted along with other mapping function parameters. The receiver receives the index and adding a mustache to the video. Video shows a synthesized instance of the video using both the existing database and the error concealment library. Eventually the database is trained to contain images of the individual wearing the mustache, such that the library is no longer needed for correcting the mustache difference.

In another embodiment, an image transformation operation from the error concealment library can be utilized. An image transformation operation can operate on a predetermined group of pixels, for example a 10×20 pixel region. The library storage size of the operation might be comparable to an image patch. For an instance, an image transformation operation might do a linear or nonlinear filtering that is pre-determined and indexed. The operation, along with all contents of the error concealment library, is assumed to be available to both the transmitter and the receiver.

2.4. Further Bitrate Reduction for Non-Real Time Video Transmission

The above description relates to transmission of video in real time or near real time. If the video does not need to be transmitted in real time, further techniques can be utilized to compress the data to be transmitted for a faithful synthesis of the region of interest. Thus, the transmission bitrate is further reduced when the video is compressed and transmitted in non-real time. The term "non-real time" in this disclosure herein means that there is certain amount of time delay, between the time when a frame the video is captured or transmitted and the time when the frame of the video is synthesized and available for display at the receiver, which is large enough to be noticeable by human, such as 20 seconds.

In one embodiment, the mapping function does not change substantially for a number of consecutive frames of the input video sequence. The receiver can be instructed to use the same set of parameters to represent the mapping function for the corresponding multiple consecutive frames.

In another embodiment, mapping functions for multiple consecutive frames can be interpolated linearly or nonlinearly based on the parameters of mapping functions for the frames immediately before and after the consecutive frames. The sets of parameters for the consecutive frames need not to be transmitted to the receiver. Instead, the receiver only needs to be instructed to interpolate the mapping functions between the frames immediately before and after the consecutive frames.

In yet another embodiment, the parameters of mapping functions for some frames can be approximated by combinations of parameters for other frames. Instead of transmitting the parameters, the receiver is instructed to calculate the parameters for certain frames based on the parameters for other frames.

In still another embodiment, the subjective quality of the video is not sensitive to a small variation of parameters for mapping functions. Therefore, a small number of bits are sufficient to represent the parameters for the mapping functions.

3. Modeling and Synthesis of Regions of Medium and Lower Interest Levels

Unlike the regions of high interest levels, there is usually little knowledge in the databases about the regions of medium and low interest levels. In the video message example mentioned above, regions of medium interest levels might include hair and shoulders. There may be some knowledge about such a region, such as hair style and color of clothes. But this knowledge is not very dependable since hairstyle can change and clothes can be different. There may be no a priori knowledge at all about the regions of low interest levels. On the other hand, these regions are of lower interest by assumption. These regions do not need to be rendered as accurately as the high interest region. Still these regions need to be realistic enough for the user at the receiver end to be satisfied by the overall video quality; and the synthesized instances of these regions need to be non-obtrusive so that the user at the receiver end is not distracted.

In one embodiment, the regions of medium or low interest levels might be objects of which the appearance is irrelevant to the message. For example, the background could be a tree, a flower, or items such as a flag. If the processor in the transmitter recognizes the object, and find a index to object in the object server directory, it could simple provide an index reference to the object in the frame. Typical these objects are not moving in the consequent frames.

In one embodiment, the compression of the medium and low interest regions can be done by a vector quantization ("VQ") method. Similar approach is discussed in the article of "An Algorithm for Vector Quantizer Design," *IEEE Transactions on Communications*, pp. 702-710, January 1980, Y. Linde, A. Buzo, and R. M. Gray, which is incorporated herein by reference in its entirety. Each of the regions are further segmented into n×m rectangular pixel sections, wherein n and m may be different for each region depending on the interest level.

These n×m sections are denoted as tiles. Each image has a given number of tiles K. Assuming the video has T frames in total, there are T×K tiles in the video. For each frame, a number of adjacent tiles are chosen as center tiles. For example, 16 or 32 center tiles may be used. Each the in each frame of the video is replaced by a center tile closest to the tile. The center tiles are small images which can be further compressed by representing them in Fourier space via the discrete cosine transform ("DCT") and discarding indices for the small high-frequency components. The important DCT values are sent to the receiver to reconstruct the tiles. Compression is achieved by sending the indices of tiles to the receiver. In one embodiment, these indices can be further compressed, in both space and time domains, with methods such as run length encoding ("RLE") and entropy encoding. The RLE and entropy method is efficient because of the small number of center tiles used, as understood by a person having ordinary skill in the art.

3.1. Special Treatment of Low Interest Level Regions

In the low interest level region, the tiles are not being updated often in time. The user will see a synthesized video with the low interest region substantially unchanged in time. This is hardly noticeable since the user likely has little interest in the region. Movement in the low interest level region can actually distract the user's attention from the regions of higher interest levels. Therefore, the fixed background, i.e. the low interest level region, is desirable. In one embodiment, there is no data transmitted for the low interest region. The receiver synthesizes the video by filling in the low interest region in each frame with a predetermined background image that is available to the receiver.

3.2. Special Treatment of Medium Interest Level Regions

Typically, the medium interest regions are not fixed in time. For example the hair moves along with the face. In these regions, further compression is achieved by tracking the evolution of the indices of the center tiles in time. It is possible some of the center tiles will stay constant over a time period. In the video message example, a portion of clothing in the shoulder area may stay unchanged over a time period. The observation of the region of the frame staying unchanged can be communicated to the receiver. The receiver treats the indicated center tile in the same way as the center tiles in the low interest level region.

Some center tiles in the medium interest level region need to be updated in time. For these center tiles, motion estimation can be carried out for interpolation. Instead of sending indices of a center tile to the receiver at every frame, the receiver may only receive indices for every N'th frame and interpolate the intermediate frames. The value of N depends on the speed of motion. The faster the movement, the smaller N has to be to give satisfying results. For example, for a rapid flick of a head, the center tiles for the region around the head need to be updated frequently.

4. Database Synchronization between Transmitter and Receivers

In one embodiment, a centralized server system (i.e., one or more server computers) is used to create and/or maintain all of the above-described databases and to track the versions of the databases. The databases can be distributed to the clients, i.e. the transmitters and receivers, on an as-needed basis. In the video message example, all databases for the individual specific, age specific, ethnicity specific faces are stored in the server with a version number noted.

When a transmitter sends parameters of a mapping function to one or more receivers, the transmitter also sends the identification and version number(s) of the database to the server. For example, the receiver may communicate to the server that it has chosen to use age 30 to 35, female database and the transmitter has versions 3.0, 4.4 and 5.2 of this database. The server checks with receivers to see what version of the database the receivers have.

The receivers respond to the server with the version numbers of the versions of this database that are available to the receivers. In one embodiment, an option is to select the lowest version commonly available to all involved clients. In another embodiment, if most of the receivers have a newer version of this database which is also available to the transmitter, the transmitter is instructed to use the newer version. Some receivers may not have the newer version of this database or may not have any version of this database. The server in such cases sends the newer version of the database to the receiver which lacks the newer version.

Figure 8:
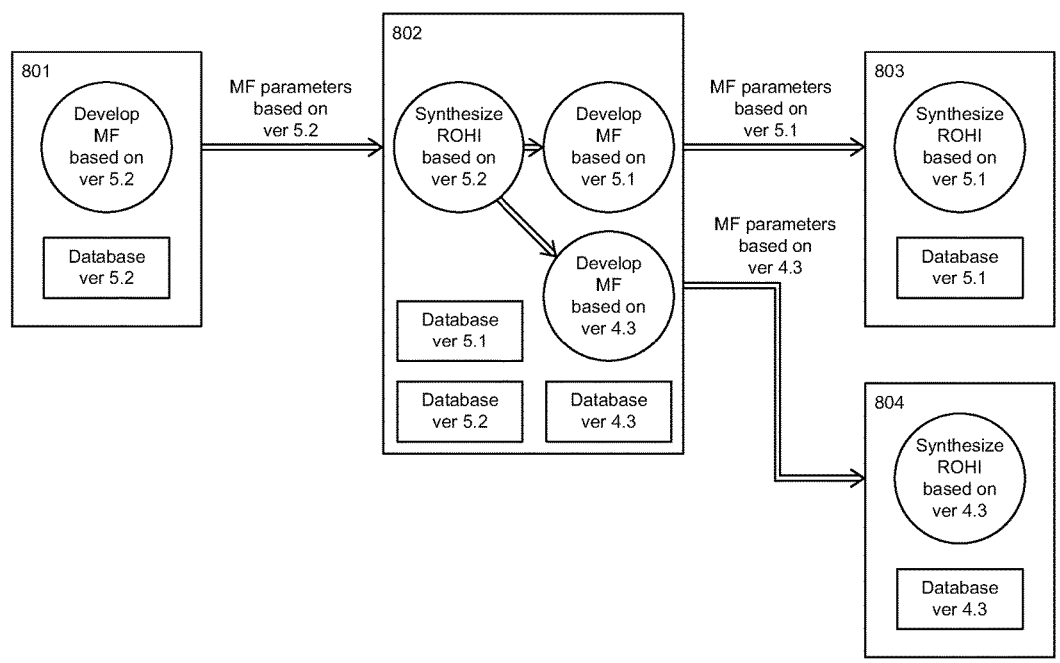
FIG. 8 illustrates an example of a server translating mapping function parameters between different versions of databases.

In yet another embodiment, one receiver does not have the newer version of the database. The server therefore translates the parameters of the mapping function based on the newer version, to parameters of a mapping function based on an older version of the database that is available to the receiver. FIG. 8 illustrates an example of the server translating the mapping function parameters between different versions of databases. For example, the transmitter 801 sends out the parameters based on a database of particular version, say version 5.2; while the receiver 803 only has the database of another version, version 5.1, and the receiver 804 only has the database of yet another version, version 4.3. The server 802 synthesizes the video region using version 5.2 database; and then computes mapping function parameters of the synthesized video region based on version 5.1 database, as well as parameters based on 4.3 database. The server 802 then transmits the translated mapping function parameters (version 5.1) to the receiver 803, and transmits the parameters (version 4.3) to the receiver 804. The receiver 803 receives the parameters (version 5.1) and is able to synthesize the video region using the appropriate available database of version 5.1; and the receiver 804 receives the parameters (version 4.3) and is able to synthesize the video region using the appropriate available database of version 4.3

In still another embodiment, instead of translating the mapping function parameters for the receivers, the server sends the newer version of the database to the receivers. For example, server 802 may send the database 5.2 to receivers 803 and 804, so that receivers 803 and 804 are able to synthesize the video region directly from mapping function parameters based on version 5.2.

In yet still another embodiment, there is no server operating between the transmitter and the receiver as an intermediary. The transmitter communicates with the receiver and determines the types of the databases and versions commonly available to both sides. The transmitter encodes the region of interest using a commonly available database available to both transmitter and receiver; the receiver then synthesizes the region using an instance of the same database.

In still yet another embodiment, the transmitter does not have the compression capability or wireless access. The video sequence is delivered to central server. In turn, the server compresses the video sequence and transmits the information to all the intended receivers in a compressed form.

5. Quality of Service (QoS) Selection: Target Bitrate vs. Choice of Modeling Method The above sections have disclosed how regions of various interest levels are encoded in different ways. For each of these regions, there is a tradeoff of quality versus bitrate. For example, for the high interest level region, there is a tradeoff between the video quality and the number of parameters used to represent the mapping function. The greater the number of parameters transmitted to the receiver per frame, the more accurate the mapping functions for representing the region will be, but at the cost of a higher bitrate. Similarly, for the medium and low interest level regions, in order to synthesize more accurate regions, the method can use a greater number of tiles, smaller dimension of the tiles, and/or a greater rate of the index updates per frame. Accordingly, the bitrate of the data transmission will increase.

When a session for video transmission is established between a transmitter and one or more receivers, a target quality of service PoS) will be negotiated. The QoS establishes a total bitrate budget which poses a constraint on the video quality. Techniques described above will in turn establish separated bitrate budgets for regions of high, medium and low interest levels. The regions of high interest levels have top priority, in terms of allocating bitrate budget. In the video message example, if the total bitrate budget is very low, the face still needs to be rendered accurately. The low interest level region can be represented as just a single color uniform background to save the quota of the bitrate budget. In another example, higher total bitrates may be allowed after the negotiation between the transmitter and receivers, where separate bitrate budgets are assigned to each region.

6. Synthesizing Video by Stitching of Regions.

Because of the different treatments of the regions of different interest levels, the high interest region will have better resolution than the medium and low interest regions. A raw combination of the regions will result in a video with an unacceptable quality. The high interest level region may therefore appear "separated" from the rest of the video image. It is possible to blur certain selected sections of the video image to alleviate this "separation" effect. However, it is not desirable to blur the entire high interest level region, which defeats the purpose of a high resolution synthesis of the region at low bitrate.

Because of the nature of modeling the high interest level region, the boundary of the region is known precisely. Instead of blurring the entire high interest level region, only small sections on the boundary of the high interest region may be blurred using standard image processing techniques known by persons of ordinary skill in the art. This treatment results in natural looking video while the high resolution of the high interest level region is not sacrificed.

In one embodiment, low and medium interest level regions are represented by relatively large tiles. In order to avoid the blocky appearance in these regions, blurring is carried out on the boundaries of the tiles in these regions as well. This blurring further directs the viewer's attention to the high interest level region.

7. Voice Modeling and Synthesizing

The goal of the voice modeling technique introduced here is to compress and transmit high quality voice information for remote synthesis at a low bitrate. In one embodiment, for a known speaker, the data rate of the transmitted voice sequence is about from 200 to 500 bits per second ("bps"). The MOS of the transmitted voice sequence is at least 4, where a maximum score of MOS is 5, so that voice features of the speakers such as accent, pronunciation, or reconcilability can be accurately modeled and synthesized. Accordingly, the voice sequence can be transmitted over the ultra-low bandwidth channel as part of the video. The voice sequence may be speech, singing, or a combination thereof. In one embodiment, the voice sequence is extracted from the video and analyzed for its correlation property in an acoustical sense.

In one embodiment, several assumptions are made. First, the message length is longer than 20 seconds. Second, there is an adaptive self-learning codebook present at the transmitter and the receiver side. Third, there is certain information about the speaker available in the codebook.

In order to achieve a massive compression while maintaining a high quality of sound, a plurality of dictionaries containing information for a speaker from multiple perspectives are collected and are made available to both transmitter and receiver, such as:

1. Dictionary of acoustic waveform models and features vectors such as cepstral patterns, or mel-frequency cepstral coefficients ("MFCC");

2. Dictionary of sounds and phonemes;

3. Dictionary of words, the dictionary may contain emotional context tags associated with the words;

4. Dictionary of frequently used sentences and/or phrases, typically from 1 second to 10 second long;

5. Dictionary of features of singing voices and models;

6. Dictionary of Visual speech model such as lips models and positions, and other facial features; and 7. Dictionary of hierarchical maps and Bayesian Networks relating the above 6 dictionaries.

Cepstral patterns are frequency domain patterns obtained by taking the Fourier transform of the voice record. For purposes of representing human voice features, the spectrum is usually first transformed using the mel scale, the resulting cepstral coefficients are called mel-frequency cepstral coefficients (MFCC).

The seventh dictionary contains Bayesian networks and hierarchical maps that connect and correlate the entries of each dictionary. For example, a recognized word, through an automatic speech recognition method, may match an entry in the third dictionary, and may correlate to the lip model in the sixth dictionary, based on the conditional dependencies in the Bayesian networks. The Bayesian networks are pre-mapped.

The entries of the dictionaries are utilized for voice modeling based on the hierarchical maps. It is preferred to use high level dictionaries. For example, the sentences and words dictionary is used in preference to the acoustical waveform dictionary. Using high level entries enables higher compression efficiency while maintaining a high quality of the voice.

Depending on the time delay sensitivity of a transmission scenario, a time windows may be available for analysis and compression. In one embodiment, up to 30 seconds of delay is allowed and available for correlation window analysis. Methods such as factor analysis, linear and nonlinear regression analysis may be used to obtain maximum correlation properties of the waveform and the associated synthesis models that are adaptive in nature and have different properties.

Figure 9:
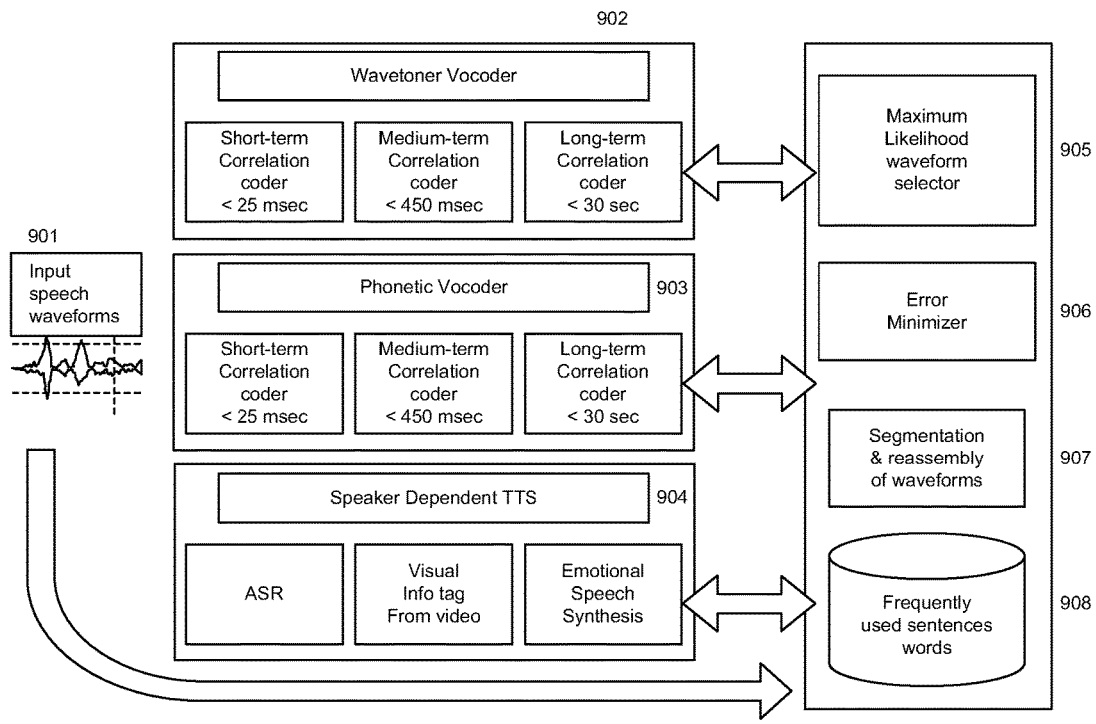
FIG. 9 is a block diagram of a voice modeling algorithm.

FIG. 9 is a block diagram of a voice modeling algorithm to be executed by a transmitter or a server, depending on which device is carrying out the transmission. The architecture is based on adaptive machine learning and mutual information available for both transmitter and receiver. Depending on the time delay window, a waveform vocal encoder ("vocoder") 902 is utilized to extract correlation information for short time scales (less than 25 msec), for medium time scales (less than 450 msec), for long time scales (less than 30 sec). Using regression analysis, correlation information in the longest possible time period is factored to model the voice. For example, linear prediction filters can be used to model the correlation in short time scales of less than 25 msec. The best model or combinations of models are used to model the current voice, and appropriate coefficients for model or models are transmitted. In some scenarios greater time delay is allowed in the given scenario, and correlation information from this longer time period can be found and represented by indices to the dictionaries. Phonetic vocoder 903 contains tagging information corresponding to the phonetic sounds. The higher level phonetic models are language dependent models to model the voice sequence. Even higher models can be used for modeling, such as the speaker dependent text-to-speech (TTS) 904 using automatic speech recognition (ASR), with visual information tagging extracted form the video and emotional speech information.

All data represented by different levels of models is synthesized within the transmitter for comparison with the original voice record 901. The waveforms of the voice sequence are segmented into sections. An error minimizer 906 runs error analysis for different models of the voice sequence as a function of time. A maximum likelihood waveform selector 905 then determines one or more models best suited for modeling each section of the voice sequence, based on calculations from an error minimizer 906. In some cases, frequently used sentences and words 908 can be utilized to model some sections of the voice sequence. A segmentation and reassembly unit 907 reassembles the sections of the voice sequence based on the information of optimal models for each section from the maximum likelihood waveform selector 905. The reassembled data corresponding to different models for reach section is transmitted to the receiver to represent the voice sequence.

In one embodiment, the above dictionaries at the beginning typically have fairly small entries. Over time, through frequent usage and interaction with core server, the dictionaries will learn and be updated with more content. In one embodiment, for dictionary 3 and 4 of each user, eventually the estimated entries will be more than 1000 words and over 100 sentences respectively.

In one embodiment, each dictionary for a speaker has three codebooks:

1. Basis Codebook ("BC"). Basis codebook is pre-calculated and shared by all communication clients (transmitters and receivers) and servers during service registration. The basis codebook is synchronized before communication begins. These speech and/or sound corpora are generally language, age, gender and accent dependent. A corpus is a large and structured set of texts. The basis codebook for each person is fairly large in size.

2. Similarity Driven Generative Codebook ("SDGC"). SDGC is created and optimized for each user on the transmitter. A copy of SDGC also resides on the server. In one embodiment, a receiver may not have direct access to the latest version of SDGC. SDGC is generated based on partial information available from the user. An estimate of the full size codebook is algorithmically generated. Methods such as Gaussian processes and maximum likelihood techniques will be used to fill in the content of the SDGC as a placeholder. As more information becomes available, the estimates will be removed and will be replaced with actual information. SDGC is being updated frequently when more voice information is received from the speaker.

3. Real-time Codebook ("RC") is where a new codebook generated from the voice sequence data in real-time and is used to compensate for the missing information which did not exist in existing BC and SDGC. RC is generated on-the-fly to provide supplemental models for catching further differences between the original voice sequence and the sequence modeled by BC and SDGC. In one embodiment, the content of RC will be updated to the SDGC after the session. In another embodiment, the RC will be discarded after the session.

The combination of these codebooks will achieve a high compression of the voice sequence by maximizing the amount of mutual information between the transmitter and the receiver. Accumulation and update of mutual information is an iterative process that will be built over time through transactions between transmitters and receivers.

The codebook is initially generated by collecting a massive dataset from various speakers, for example more than of 1000 different speakers. The data may be collected from various public sources such as radio broadcasts, movies, and other recordings of various types. Off-line calculations are carried out by use of K-mean methods with multiple different dimensions. A subset of the codebook is selected as the basis codebook set; so that through linear or nonlinear regression methods, other codebooks can be generated. The generated codebook may be a close approximation of a personalized codebook for an individual.

In one embodiment, several assumptions are made. First, the message length is longer than 20 seconds. Second, there is an adaptive self-learning codebook present at the transmitter and the receiver side. Third, there is certain information about the speaker available in the codebook.

The acoustical information includes all formant frequencies, such as F0, F1-F6. The acoustical information further includes various transition parameters relevant to changes in formant frequencies. Acoustic features of voice may be broken into two parts because they show different autocorrelation property. Voiced speech is produced by exciting the vocal tract with quasi-periodic glottal air pulses generated by the vibrating vocal chords. The frequency of the periodic pulses is referred to as the fundamental frequency or pitch. Unvoiced speech is produced by forcing air through a constriction in the vocal tract. Typically, the unvoiced part is a white noise like signal with a broad spectrum and a low energy. The voiced part is highly periodic with well-behaved auto-correlation properties.

Basic waveform voice encoders Vocoders") can be utilized to synthesize speech with a short-term correlation window(less than 25 msec). More compression can be achieved if the correlation window is extended. Medium-term correlation (less than 450 msec) and long-term correlation (less than 30 sec) are chosen for finding better VQ models and more correlation properties Phonetic voice encoders can be utilized to generate phonetic formant frequency information about short-term correlation (less than 25 msec), medium-term correlation (less than 450 msec) and long-term correlation (less than 30 sec).

Figure 10:
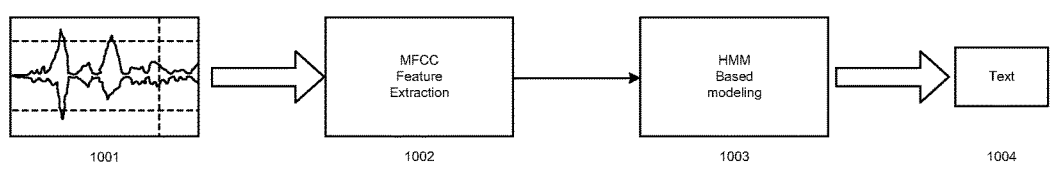
FIG. 10 is a block diagram of an automatic speech recognition (ASR) method.

At the transmitter, automatic speech recognition ("ASR") method is also applied to the voice sequence to generate a text sequence. As illustrated in FIG. 10, the ASR method extracts the MFCC features as MFCC coefficients (1002) from the voice sequence 1001. The MFCC coefficients are fed to a Hidden Markov Model ("HMM") engine (1003) to determine the text (1004). These coefficients are extracted based on the context and/or emotion tagging Information about pitch frequency F0, time statistics, frequency statistics, time and frequency joint statistics, is extracted from the ASR module. Excitation coefficients for speech synthesis are obtained and may be modified from a joint decision between available sets of stored sound vectors. The generated excitation coefficients are fed to source models and filters modules to synthesize a sound wave as an instance of synthesized voice sequence from the text sequence with context/emotional tagging, At the receiver, coded speech is fed to a vocoder to play back the speech feeding information about excitation codes and source filter models that were used at the transmitter based on available mutual information shared by both the transmitter and the receiver. In the case when only text is received by the receiver a speaker dependent text-to-speech ("TTS") method is used to synthesize an instance of the voice sequence by using the text sequence, the visual information tags, the emotional information, waveform torment frequency information and phonetic formant frequency information.

Approaches similar to methods disclosed in this section are discussed in articles including: "Quantization of LPC parameters", *Speech Coding and Synthesis*, Amsterdam, Elsvier Science B. V., 1995, K. K. Paliwal, W. B. Kleijn; "Speech coding, a tutorial review", *Proceedings of IEEE*, October 1994, A. S. Spanias; "Speech coding algorithms: Foundation and Evolution of Standardized Coders", John Wiley and Sons, 2003, W. C. Chu; "Linear inter-frame dependencies for very low bit-rate speech coding," *Speech Communication* 34 (2001) 333-349, J. M. Lopez-Sole, et al; "A tutorial on Hidden Markov Models and Selected Applications in Speech Recognition," *Proceedings of IEEE*, February 1989, L. R. Rabiner; "Vowel Spectra, Vowel Spaces, and Vowel Identification," *Journal of Acoustical Society of America*, Vol 48, 1970, W. Klein, et al; all of which are incorporated herein by reference in their entireties.

8. Implementation of Transmitters, Receivers and Servers.

The transmitters and receivers disclosed in the embodiments may be any devices that have network communication abilities and processing powers to model or synthesize the video. The server may be any computer or group of computers that each has network communication abilities and storage capability to store the databases. The transmitter, receiver, and server may be devices such as mobile phones (e.g., "smartphones"), PDAs, portable computers, desktop computers, netbooks, tablets, network servers, storage servers.

Figure 11:
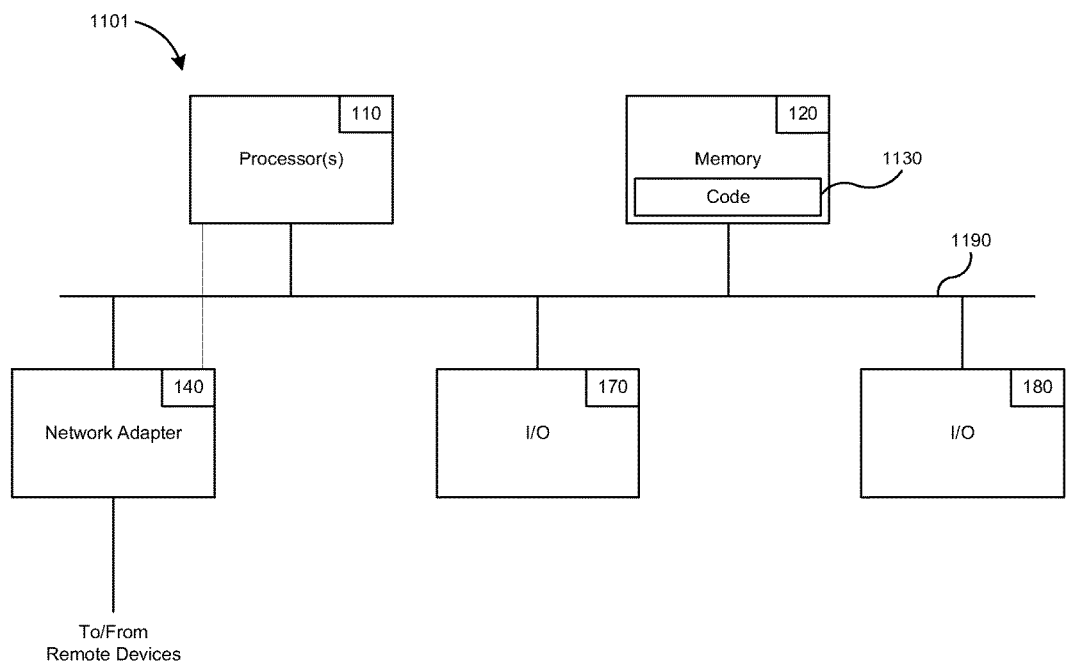
FIG. 11 is a block diagram of a processing system that can be used to implement a transmitter, receiver or server implementing the techniques described herein.

FIG. 11 is a block diagram of a processing system that can be used to implement any of the techniques described above, as a transmitter or a receiver or both. Note that in certain embodiments, at least some of the components illustrated in FIG. 11 may be distributed between two or more physically separate but connected computing platforms or boxes. The processing can represent a conventional server-class computer, PC, mobile communication device (e.g., smartphone), or any other known or conventional processing/communication device.

The processing system 1101 shown in FIG. 11 includes one or more processors 1110, i.e. a central processing unit (CPU), memory 1120, at least one communication device 1140 such as an Ethernet adapter and/or wireless communication subsystem (e.g., cellular, Wi-Fi, Bluetooth or the like), and one or more I/O devices 1170, 1180, all coupled to each other through an interconnect 1190.

The processor(s) 1110 control(s) the operation of the computer system 1101 and may be or include one or more programmable general-purpose or special-purpose microprocessors, microcontrollers, application specific integrated circuits (ASICs), programmable logic devices (PLDs), or a combination of such devices. The interconnect 1190 can include one or more buses, direct connections and/or other types of physical connections, and may include various bridges, controllers and/or adapters such as are well-known in the art. The interconnect 1190 further may include a "system bus", which may be connected through one or more adapters to one or more expansion buses, such as a form of Peripheral Component Interconnect (PCI) bus, HyperTransport or industry standard architecture (ISA) bus, small computer system interface (SCSI) bus, universal serial bus (USB), or Institute of Electrical and Electronics Engineers (IEEE) standard 1394 bus (sometimes referred to as "Firewire").

The memory 1120 may be or include one or more memory devices of one or more types, such as read-only memory (ROM), random access memory (RAM); flash memory; disk drives; etc. The network adapter 1140 is a device suitable for enabling the processing system 1101 to communicate data with a remote processing system over a communication link, and may be, for example, a conventional telephone modem, a wireless modem, a Digital Subscriber Line (DSL) modem, a cable modem, a radio transceiver, a satellite transceiver, an Ethernet adapter, or the like. The I/O devices 1170, 1180 may include, for example, one or more devices such as: a pointing device such as a mouse, trackball, joystick, touchpad, or the like; a keyboard; a microphone with speech recognition interface; audio speakers; a display device; etc. Note, however, that such I/O devices may be unnecessary in a system that operates exclusively as a server and provides no direct user interface, as is the case with the server in at least some embodiments. Other variations upon the illustrated set of components can be implemented in a manner consistent with the invention.

Software and/or firmware 1130 to program the processor(s) 1110 to carry out actions described above may be stored in memory 1120. In certain embodiments, such software or firmware may be initially provided to the computer system 1101 by downloading it from a remote system through the computer system 1101 (e.g., via network adapter 1140).

The techniques introduced above can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

In one embodiment, a method is introduced. The method comprises: capturing a video sequence at a mobile communication device; sending a data sequence representative of the video sequence from the mobile communication device to a remote device over a wireless communication link in an ultra low bit rate channel; receiving the data sequence at the remote device; and synthesizing the video sequence based on the data sequence and a database mutually available to both the mobile communication device and the remote device.

In a related embodiment, the database comprises a visual characteristics model of human. In another related embodiment, the database further comprises steps of building a database having a visual characteristics model of human based on a plurality of images; and transmitting the database to the mobile communication device and the remote device. In another related embodiment, the method further comprises a step of identifying, by the mobile communication device, a cognitively visually important region in the frames of the video sequence as a region having cognitive visual importance from a real or hypothetical human viewer's perspective. In another related embodiment, the method further comprises a step of developing the data sequence based on the cognitively visually important region in the frames of the video sequence, the data sequence representing a time series of mapping functions of a database, the mapping functions modeling visual characteristics of a person. In another related embodiment, the step of identifying comprises: segmenting each frame of the video sequence into a plurality of regions; and evaluating each of the plurality of regions based on the database and recognizing a cognitively visual important region of the plurality of regions based on a result of said evaluating. In another related embodiment, the data sequence represents a time series of mapping functions of the database, and the mapping functions model visual characteristics of a person. In another related embodiment, the database comprises a visual characteristics model of human, and the mapping functions models the visual characteristics of the person based on the visual characteristics model in the database. In another related embodiment, the step of synthesizing comprises synthesizing the video sequence by calculating the time series of mapping functions based the database In another embodiment, there introduced another method. The method comprises: capturing an audio sequence of a person; recognizing a set of texts, an associated set of emotions, and an associated set of formant frequencies from the audio sequence; updating a codebook with the set of texts, the associated set of emotions, and the associated set of formant frequencies; generating a time-stamped set of indices of the set of texts, the associated set of emotions; and the associated set of formant frequencies to the codebook; transmitting the time-stamped set of indices to a remote device; and reconstructing an instance of the audio sequence based on the time-stamped set of indices and the codebook.

In another embodiment, there introduced another method. The method comprises: creating a dictionary having a basis codebook set, a similarity driven generative codebook set and a real-time adaptive codebook set, each codebook set containing one or more codebooks, each codebook including indices to sound vectors, associated formant frequencies, words and phrases; updating the basis codebook set by analyzing audio sequences from a plurality of persons; updating the similarity driven generative codebook set to model a person's audio characters; capturing an audio sequence of the person; updating the real-time codebook set by analyzing the audio sequence; generating a set of parameters based on the dictionary; transmitting the set of parameters to a remote device; and regenerating the audio sequence based on the set of parameters and the dictionary.

In another embodiment, there introduced another method. The method comprises: modeling a voice sequence of a person by generating indices to a plurality of voice models store in a plurality of dictionaries; segmenting the voice sequence into a plurality of sections; choosing one or more optimal models for each section of the plurality of sections; reassembling a data sequence representing the voice sequence by combining the indices to the optimal models for each section of the plurality of sections; and transmitting the data sequence to a remote device.

In a related embodiment, the plurality of dictionaries includes a dictionary of acoustic waveform models. In another related embodiment, the plurality of dictionaries includes a dictionary of sounds and phonemes. In another related embodiment, the plurality of dictionaries includes a dictionary of words. In another related embodiment, the dictionary of words further includes emotional context tags. In another related embodiment, the plurality of dictionaries includes a dictionary of sentences and phrases. In another related embodiment, the plurality of dictionaries includes a dictionary of singing voice models. In another related embodiment, the plurality of dictionaries includes a dictionary of visual speech models. In another related embodiment, the plurality of dictionaries includes a dictionary of hierarchical maps and Bayesian Networks relating to entries of other dictionaries of the plurality of dictionaries.

In another related embodiment, each of the plurality of dictionaries includes a basis codebook. In another related embodiment, each of the plurality of dictionaries includes similarity driven generative codebook. In another related embodiment, the method further comprises a step of generating a real-time codebook to compensate a difference between the voice sequence and a synthesized instance of the voice sequence based on the plurality of voice models. In another related embodiment, the indices to the acoustic waveform models are generated by computing correlation information in at least a portion of the voice sequence. In another related embodiment, the indices to the sounds and phonemes are generated by computing correlation information in at least a portion of the voice sequence. In another related embodiment, the indices to the words of the dictionary are generated by an automatic speech recognition method. In another related embodiment, the step of choosing comprises choosing one or more optimal models for each section of the plurality of sections using a maximum likelihood waveform selector.

In another embodiment, there described a method. The method comprises: receiving, at a receiving device, a data sequence representative of a video sequence sent from a sending device via a wireless communication link; and synthesizing the video sequence at the receiving device based on the data sequence and mutual information available to both the sending device and the receiving device.

In a related embodiment, the mutual information comprises a visual characteristics model of human. In another related embodiment, the mutual information is in a database. In another related embodiment, the data sequence represents a time series of mapping functions of a database, and the mapping functions model visual characteristics of a person. In another related embodiment, the database comprises a visual characteristics model of human, and the mapping functions models the visual characteristics of the person based on the visual characteristics model in the database. In another related embodiment, the step of synthesizing comprises synthesizing the video sequence by calculating the time series of mapping functions based the database. In another related embodiment, the data sequence is a time-series of sets of parameters, and each set of parameters represents one mapping function of the time-series of mapping functions. In another related embodiment, the time-series of sets of parameters are a time series of sets of projection coefficients, and the time series of the set of projection coefficients is generated by projecting a cognitively important region of each frame of the video sequence on a set of the basis eigenvectors in a dictionary. In another related embodiment, the step of synthesizing comprises synthesizing the video sequence by calculating a linear combination of the basis eigenvectors with the projection coefficients.

In another embodiment, there described a method. The method comprises: building a database having a visual characteristics model of one or more objects, the one or more objects including a person based on a plurality of images; and transmitting the database to at least one remote device.

In a related embodiment, the visual characteristics model comprises a plurality of eigenimages, and each of the plurality of eigenimages represents a variation of the visual characteristics model. In another related embodiment, the plurality of eigenimages is generated based on the plurality of images. In another related embodiment, the plurality of eigenimages are a set of basis eigenvectors, and each of the plurality of basis eigenvectors represents a direction in which images differ from a mean image of the plurality of images. In another related embodiment, the plurality of images is extracted from a video from a person. In another related embodiment, the step of transmitting comprises transmitting the dictionary to at least one video transmitting device and at least one remote device. In another related embodiment, the plurality of basis eigenvectors are calculated from an autocorrelation matrix, the autocorrelation matrix is constructed using the plurality of images.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. A method comprising:
capturing or retrieving a video sequence at a communication device that includes a plurality of databases, each of the plurality of databases comprising a plurality of images, the plurality of databases including a first database and a second database;
segmenting a first frame of the video sequence into at least a first region and a second region;
using the first database, determining a first mapping function for the first region;
synthesizing a first image of the first region using the first mapping function and the first database;
determining a first synthesis fidelity of the first image of the first region;
using the second database, determining a second mapping function for the first region;
synthesizing a second image of the first region using the second mapping function and the second database;
determining a second synthesis fidelity of the second image of the first region;
selecting the first image based on a selection criterion, the selection criterion resulting in the second synthesis fidelity being less optimal than the first synthesis fidelity; and
sending the first mapping function and information identifying the first database from the communication device to at least one remote device over a wireless communication link in an ultra low bit rate channel.

2. The method of claim 1, wherein the ultra low bit rate channel is a short message service (SMS) channel.

3. The method recited in claim 1, wherein the first mapping function represents a linear combination of a plurality of images from the first database.

4. The method recited in claim 3, wherein the first mapping function comprises a set of coefficients.

5. The method recited in claim 1, wherein the first mapping function comprises a plurality of eigenvectors.

6. The method recited in claim 1, further comprising:
selecting the first and second databases based on an identity of an object in the video sequence.

7. The method recited in claim 6, wherein the object in the video sequence is a human being.

8. The method recited in claim 6, wherein the object in the video sequence is a particular human being, and wherein the first database comprises images of the particular human being.

9. The method recited in claim 6, further comprising:
optimizing the first database based on a characteristic of the particular human being.

10. The method recited in claim 9, wherein the characteristic is an age, a gender, or an ethnicity.

11. The method recited in claim 1, wherein the first and second databases include different views of an object.

12. The method recited in claim 11, wherein the object is a face, and wherein the first database includes a plurality of front views and the second database includes a plurality of partial or full side views.

13. The method recited in claim 1, wherein the selection criterion is a first selection criterion, and further comprising:
using a third database of the plurality of databases, determining a third mapping function for the first region;
synthesizing a third image of the first region using the third mapping function and the third database;
determining a third synthesis fidelity of the third image of the first region; and
based on a second selection criterion, determining that the third synthesis fidelity is less optimal than the first synthesis fidelity.

14. The method recited in claim 13, wherein the third mapping function represents a linear combination of a plurality of images from the third database.

15. The method recited in claim 14, wherein the third mapping function comprises a set of coefficients.

16. The method recited in claim 13, wherein the third mapping function comprises a plurality of eigenvectors.

17. The method recited in claim 13, wherein (a) the first selection criterion is a gender and the second selection criterion is an age range, or vice versa, or (b) the first selection criterion is an age range and the second selection criterion is an ethnicity, or vice versa, or (c) the first selection criterion is a gender and the second selection criterion is an ethnicity, or vice versa.

18. The method recited in claim 1, further comprising:
segmenting a second frame of the video sequence into at least a third region and a fourth region, wherein the third region corresponds to the first region;
using the first database, determining a third mapping function for the third region; and
sending, to the at least one remote device, the third mapping function.

19. The method recited in claim 18, wherein the third mapping function represents a linear combination of a plurality of images from the first database.

20. The method recited in claim 19, wherein the third mapping function comprises a set of coefficients.

21. The method recited in claim 18, wherein a boundary of the third region differs from a boundary of the first region.

22. The method recited in claim 18, wherein segmenting the second frame of the video sequence into at least the third region and the fourth region comprises:
identifying the third region; and
identifying the fourth region based on a relationship between the fourth region and the third region.

23. The method recited in claim 18, further comprising:
synthesizing a third image of the third region using the third mapping function and the first database;
determining a third synthesis fidelity of the third image of the third region;
using a third database of the plurality of databases, determining a fourth mapping function for the third region;
synthesizing a fourth image of the third region using the fourth mapping function and the third database;
determining a fourth synthesis fidelity of the fourth image of the third region;
selecting the third image based on the selection criterion, the selection criterion resulting in the fourth synthesis fidelity being less optimal than the third synthesis fidelity.

24. The method recited in claim 1, wherein the selection criterion is that the first synthesis fidelity is more optimal than the second synthesis fidelity.

25. The method recited in claim 1, wherein the selection criterion accounts for a gender, an age range, or an ethnicity.

26. The method recited in claim 1, wherein the first synthesis fidelity is based on a difference between the first image and the first region, and the second synthesis fidelity is based on a difference between the second image and the first region.

27. The method recited in claim 1, wherein the first synthesis fidelity is a sum of pixel value differences between the first region and the first image, and the second synthesis fidelity is a sum of pixel value differences between the first region and the second image, and wherein the selection criterion is to select the lower of the first synthesis fidelity and the second synthesis fidelity.

28. The method recited in claim 1, wherein a bit rate of the ultra low bit rate channel is no greater than 6,500 bits per second.

29. The method recited in claim 1, further comprising:
sending information identifying a version of the first database.

30. The method recited in claim 1, further comprising:
updating the first database based on the first frame of the video sequence.

31. The method recited in claim 1, further comprising:
identifying a change in the second region relative to a previously-processed frame of the video sequence; and
sending, to the at least one remote device, information characterizing the change in the second region.

32. The method recited in claim 31, wherein the previously-processed frame of the video sequence is two or more frames before the first frame.

* * * * *